US008661548B2

(12) United States Patent
Shannon et al.

(10) Patent No.: US 8,661,548 B2
(45) Date of Patent: *Feb. 25, 2014

(54) EMBEDDED SYSTEM ADMINISTRATION AND METHOD THEREFOR

(75) Inventors: John P. Shannon, Dunrobin (CA); Thane Brown, Kanata (CA); John McCarthy, Ottawa (CA); David A. Watson, Dunrobin (CA); Anthony Richard Phillip White, Ottawa (CA)

(73) Assignee: Embotics Corporation, Ottawa (CA)

( * ) Notice: Subject to any disclaimer, the term of this patent is extended or adjusted under 35 U.S.C. 154(b) by 396 days.

This patent is subject to a terminal disclaimer.

(21) Appl. No.: 12/718,962

(22) Filed: Mar. 6, 2010

(65) Prior Publication Data

US 2010/0186094 A1 Jul. 22, 2010

Related U.S. Application Data

(63) Continuation of application No. 10/895,626, filed on Jul. 21, 2004, now Pat. No. 7,725,943.

(51) Int. Cl.
*H04L 29/06* (2006.01)
*G06F 11/30* (2006.01)
*G06F 21/50* (2013.01)

(52) U.S. Cl.
CPC ............ *G06F 11/3055* (2013.01); *G06F 21/50* (2013.01)
USPC .......................................................... 726/26

(58) Field of Classification Search
CPC ...... G06F 11/3055; G06F 11/30; G06F 21/50
USPC .......................................................... 726/26
See application file for complete search history.

(56) References Cited

U.S. PATENT DOCUMENTS

| 4,819,234 A | | 4/1989 | Huber |
| 5,327,428 A | * | 7/1994 | Van As et al. ................. 370/353 |
| 5,513,062 A | * | 4/1996 | Paul et al. ....................... 361/90 |
| 5,559,958 A | | 9/1996 | Farrand |
| 5,655,081 A | | 8/1997 | Bonnell |
| 5,696,895 A | * | 12/1997 | Hemphill et al. ............... 714/4.3 |
| 5,781,716 A | * | 7/1998 | Hemphill et al. ............... 714/4.5 |
| 5,822,512 A | * | 10/1998 | Goodrum et al. ............... 714/13 |
| 5,864,659 A | * | 1/1999 | Kini ................................ 714/31 |

(Continued)

FOREIGN PATENT DOCUMENTS

| JP | 2000 245076 | 9/2000 |
| WO | WO 01/16744 | 3/2001 |
| WO | WO02/01347 | 1/2002 |

OTHER PUBLICATIONS

Lightstone et al., Toward Autonomic Computing with DB2 Universal Database,Sep. 2002, IEEE.*

(Continued)

*Primary Examiner* — David Garcia Cervetti
(74) *Attorney, Agent, or Firm* — Victoria Donnelly; IP-MEX Inc.

(57) ABSTRACT

An administration system for use within a server system is provided. The server system having a server that provides host management functions and the server system being able to accept computer cards inserted therein. The administration system comprises a computing system that is inserted in the server system, the computing system having a controller that assumes control over the communications bus.

30 Claims, 28 Drawing Sheets

(56) References Cited

U.S. PATENT DOCUMENTS

| | | | |
|---|---|---|---|
| 5,951,686 A * | 9/1999 | McLaughlin et al. | 713/2 |
| 5,987,621 A * | 11/1999 | Duso et al. | 714/4.11 |
| 6,058,434 A * | 5/2000 | Wilt et al. | 719/310 |
| 6,065,123 A * | 5/2000 | Chou et al. | 713/322 |
| 6,070,253 A * | 5/2000 | Tavallaei et al. | 714/31 |
| 6,122,664 A | 9/2000 | Boukobza | |
| 6,131,131 A * | 10/2000 | Bassman et al. | 710/15 |
| 6,138,239 A * | 10/2000 | Veil | 726/10 |
| 6,161,196 A * | 12/2000 | Tsai | 714/10 |
| 6,564,326 B2 * | 5/2003 | Helbig, Sr. | 726/34 |
| 6,591,376 B1 * | 7/2003 | VanRooven et al. | 714/36 |
| 6,697,962 B1 * | 2/2004 | McCrory et al. | 714/27 |
| 6,732,067 B1 * | 5/2004 | Powderly | 703/24 |
| 6,856,942 B2 * | 2/2005 | Garnett et al. | 702/183 |
| 6,889,285 B2 | 5/2005 | Dawson et al. | |
| 6,957,288 B2 * | 10/2005 | Metevier et al. | 710/100 |
| 6,986,057 B1 * | 1/2006 | Cusey et al. | 713/161 |
| 7,058,860 B2 | 6/2006 | Miller | |
| 7,083,090 B2 * | 8/2006 | Zuili | 235/383 |
| 7,085,921 B2 | 8/2006 | Frye | |
| 7,096,459 B2 | 8/2006 | Keller et al. | |
| 7,182,250 B2 * | 2/2007 | Kelly et al. | 235/375 |
| 7,194,445 B2 | 3/2007 | Chan et al. | |
| 7,234,099 B2 * | 6/2007 | Gower et al. | 714/767 |
| 7,269,762 B2 * | 9/2007 | Heckmann et al. | 714/47.1 |
| 7,275,235 B2 | 9/2007 | Molinari et al. | |
| 7,287,177 B2 | 10/2007 | Bonaccio | |
| 7,287,179 B2 * | 10/2007 | Doyle et al. | 714/4.11 |
| 7,302,698 B1 * | 11/2007 | Proudler et al. | 726/2 |
| 7,409,577 B2 * | 8/2008 | Wing et al. | 714/4.12 |
| 7,420,952 B2 | 9/2008 | da Costa et al. | |
| 7,467,180 B2 * | 12/2008 | Kaufman et al. | 709/201 |
| 7,487,494 B2 | 2/2009 | Chan | |
| 7,512,679 B2 | 3/2009 | Boyd | |
| 7,512,981 B2 | 3/2009 | Pearson | |
| 7,533,173 B2 | 5/2009 | Badovinatz | |
| 7,590,984 B2 * | 9/2009 | Kaufman et al. | 718/105 |
| 7,617,304 B2 | 11/2009 | Devarakonda et al. | |
| 7,653,727 B2 * | 1/2010 | Durham et al. | 709/225 |
| 7,685,348 B2 * | 3/2010 | Larson et al. | 710/302 |
| 7,689,872 B2 * | 3/2010 | Doyle et al. | 714/48 |
| 7,734,561 B2 | 6/2010 | Uttamchanda | |
| 7,886,273 B2 | 2/2011 | Hinchey et al. | |
| 2001/0052108 A1 | 12/2001 | Bowman-Amuah | |
| 2001/0056539 A1 * | 12/2001 | Pavlin et al. | 713/193 |
| 2002/0002583 A1 * | 1/2002 | Fabri et al. | 709/203 |
| 2002/0103987 A1 * | 8/2002 | Jaffrey | 712/32 |
| 2002/0155892 A1 * | 10/2002 | Mishina et al. | 463/42 |
| 2002/0166062 A1 * | 11/2002 | Helbig, Sr. | 713/200 |
| 2002/0169738 A1 * | 11/2002 | Giel et al. | 706/60 |
| 2002/0184542 A1 * | 12/2002 | Vicard et al. | 713/300 |
| 2003/0005362 A1 | 1/2003 | Miller | |
| 2003/0061094 A1 * | 3/2003 | Banerjee et al. | 705/14 |
| 2003/0110388 A1 * | 6/2003 | Pavlin et al. | 713/190 |
| 2003/0177224 A1 | 9/2003 | Nguyen | |
| 2003/0200322 A1 * | 10/2003 | Childs et al. | 709/229 |
| 2003/0229406 A1 | 12/2003 | Maity | |
| 2003/0237022 A1 | 12/2003 | Thayer | |
| 2004/0026496 A1 * | 2/2004 | Zuili | 235/379 |
| 2004/0049573 A1 * | 3/2004 | Olmstead et al. | 709/224 |
| 2004/0059704 A1 * | 3/2004 | Hellerstein et al. | 707/1 |
| 2004/0059966 A1 * | 3/2004 | Chan et al. | 714/48 |
| 2004/0088510 A1 * | 5/2004 | Hori | 711/165 |
| 2004/0105298 A1 * | 6/2004 | Symes | 365/149 |
| 2004/0122950 A1 | 6/2004 | Morgan | |
| 2004/0153749 A1 * | 8/2004 | Schwarm et al. | 714/11 |
| 2004/0172574 A1 * | 9/2004 | Wing et al. | 714/4 |
| 2004/0177182 A1 * | 9/2004 | Metevier et al. | 710/100 |
| 2004/0181682 A1 * | 9/2004 | Orino et al. | 713/200 |
| 2004/0225854 A1 | 11/2004 | Friauf | |
| 2004/0243915 A1 * | 12/2004 | Doyle et al. | 714/796 |
| 2004/0244006 A1 * | 12/2004 | Kaufman et al. | 718/105 |
| 2004/0255167 A1 | 12/2004 | Knight | |
| 2004/0261070 A1 * | 12/2004 | Miller et al. | 717/170 |
| 2005/0015571 A1 * | 1/2005 | Kaufman et al. | 712/10 |
| 2005/0015668 A1 * | 1/2005 | Doyle et al. | 714/25 |
| 2005/0060567 A1 | 3/2005 | Shannon et al. | |
| 2005/0071449 A1 | 3/2005 | Alex et al. | |
| 2005/0091351 A1 | 4/2005 | Badovinatz | |
| 2005/0131993 A1 | 6/2005 | Fatula | |
| 2005/0154576 A1 | 7/2005 | Tarui | |
| 2005/0235360 A1 | 10/2005 | Pearson | |
| 2005/0256947 A1 | 11/2005 | Davarakonda et al. | |
| 2005/0268099 A1 * | 12/2005 | Cusey et al. | 713/168 |
| 2005/0268148 A1 * | 12/2005 | Matsubara et al. | 714/2 |
| 2006/0156274 A1 | 7/2006 | Andreev et al. | |
| 2006/0242395 A1 | 10/2006 | Fausak | |
| 2007/0168967 A1 | 7/2007 | Chopra et al. | |

OTHER PUBLICATIONS

Dong et al., AUTONOMIA: An Autonomic Computing Environment, 2003, IEEE.*
Lewandowski et al.,SARA: Survivable Autonomic Response Architecture, 2001, IEEE.*
David Pescovitz, Helping Computers Help Themselves, Sep. 2002, IEEE.*
De Wolf et al., Towards Autonomic Computing: Agent-Based Modelling, Dynamical Systems Analysis, and Decentralised Control, 2003, IEEE.*
Roy Sterritt, Towards Autonomic Computing: Effective Event Management,2003, IEEE.*
Yoshihiro Tohma, Fault Tolerance in Autonomic Computing Environment,2002, IEEE.*
Evaristus Mainsah, Autonomic computing: the next era of computing, Feb. 2002, Electronics & Communication Engineering Journal.*
Lanfranchi et al., Toward a new landscape of systems management in an autonomic computing environment,2003, IBM Systems Journal.*
Bantz et al., Autonomic personal computing,2003, IBM Systems Journal.*
American Megatrends, "MegaRAC(TM) G3", MegaRAC G3 User's Guide, Jun. 7, 2004.
American Megatrends, "MegaRACRG3", www.ami.com, printed Oct. 19, 2004.
K. Appleby et al., "Yemanja—A Layered Event Correlation Engine for Multi-Domain Server Farms" 17 pages, IBM T.J. Watson Research Center, Hawthorne, NY 2000.
Berggren C. "The BiProcessor: A Merger of Two Architectures" IBM Systems Journal, IBM Corporation, Armonk, New York, USA, vol. 31, No. 3, pp. 535-549, Jan. 1992.
Lau et al, "Learning Procedures for Autonomic Computing", pp. 1-4, 2003.
"Autonomic Computing: An insider's perspective", IBM pp. 1-6, 2005.
Cert, Vulnerability Remediation, www.cert.org, published prior to Jul. 21, 2003.
Sterritt.R, Bustard.D, McCrea, A. "Autonomic Computing Correlation for Fault Management System Evolution" IEEE International Conference on Industrial Informatics, p. 233-247, Aug. 2003.
I. Katzela et al., Schemes for Fault Identification in Communication Networks, IEEE Transactions on Networking, Center for Telecommunications Research Electrical Engineering, 1995, p. 32, Columbia University, New York, N.Y. 10027.
B. Gruschke, Integrated Event Management: Event Correlation Using Dependency Graphs, Proceedings of the 9th IFIP/IEEE International Workshop on Distributed Systems Operation and Management (DSOM'98), Oct. 1998, p. 12, Department of Computer Science, University of Munich, Munich, Germany.
USPTO, IEEE Xplore, Results of the search by the examiner, Apr. 28, 2008, including references dated 2005-2006-2008, p. 2, http://ieeexplore.ieee.org/search/searchresult.
Open Services Gateway Initiative (OSGi), About the OSGi Service Platform, Technical Whitepaper, p. 17, http:www.osgi.org/documents/osgi_technology/osgi-sp-overview.pdf/, accessed Jul. 12, 2004, OSGi Alliance.
Knopflersish, http:www.knopflerfish.org/, accessed Apr. 2, 2006.
Eclipse, http:www.eclipse.org/, accessed Jan. 24, 2005.
Jeops, http:www.jeops.org/, accessed Jan. 24, 2005.

(56) References Cited

OTHER PUBLICATIONS

R. Sterritt, Towards Autonomic Computing: Effective Event Management, Proceedings of 27th Annual IEEE/NASA Sortware Engineering Workshop (SEW), Dec. 3-5, 2002, p. 8, Maryland, USA.
Open Services Gateway Initiative (OSGi), http:www.osgi.org, accessed Jan. 24, 2005.
R. Murch, Autonomic Computing, Prentice Hall, 2004, p. 2., IBM. Berkeley Recovery Oriented Computing Group, http://roc.cs.berkeley.edu/accessed Jan. 24, 2005.
Agent Building and Learning Environment (ABLE), http://www.research.ibm.com/able/, accessed Jan. 24, 2005.
R. Sterritt et al., Autonomic Computing—a Means of Achieving Dependability? Proceedings of IEEE International Conference on the Engineering of Computer Based Systems (ECBS'03), Apr. 7, 2003, pp. 247-251, Huntsville, Ala., USA.
J. McGary et al., Exploring the Next-Generation DRAC 4 Dell Remote Access Controller, Special section: New-generation server technology, Dell Power Solutions Magazine, Oct. 2004, pp. 18-21.
W. Pan et al., Remote Management with Virtual Media in the DRAC 4, Special section: New-generation server technology, Dell Power Solutions Magazine, Oct. 2004, pp. 30-35.
G. Ao et al., Software Hot-swapping Techniques for Upgrading Mission Critical Applications on the Fly, M. Eng., Carleton University, May 2000, p. 135.
N. Feng, S-Module Design for Sofh.are Hot-Swapping, M. Eng., Carleton University, May 1999, p. 106.
G. Reynaga, Hot Swapping using State Persistence, A Framework for State Transfer, M.C.S., Carleton University, Aug. 2004, p. 143.
J. Appavoo et al., Enabling autonomic behavior in systems software with hot swapping, IBM Systems Journal, 42, No. 1, 2003, pp. 60-76.
G. Candea et al., Designing for High Availability and Measurability, Proceedings of the 1st Workshop on Evaluating and Architecting System Dependability (EASY), Jul. 2001, p. 6, Stanford University, Goeteborg, Sweden.
G. Candea et al., Reducing Recovery Time in a Small Recursively Restartable System, Proceedings of the International Conference on Dependable Systems and Networks (DSN-2002), Jun. 2002, p. 10, Washington, D.C., USA.
G. Candea et al., Improving Availability with Recursive Micro-Reboots: A Soft-State System Case Study, Performance Evaluation Journal, vol. 56, Nos. 1-3, Mar. 2004, p. 26, Stanford University.
S. Hariri et al., An Autonomic Application Development & Management Environment, IEEE Communication; XML-based Management of Network and Services, 2003, p. 15, University of Arizona Tucson, AZ 85721, USA, http://www.ece.arizona.edu/~zhang/xml.pdf, accessed Jan. 24, 2005.
Walsh et al. Utility functions in autonomic systems, International Conference on Autonomic Computing, May 2004, pp. 70-77, Retrieved on [May 30, 2013], Retrieved from the Internet: URL<http://ieeexplore.ieee.org/xpls/abs_all.jsp?arnumber=1301349&tag=1>.
Tesauro et al. A multi-agent systems approach to autonomic computing, AAAMAS '04 Proceedings of the Third International Joint Conference on Autonomous Agents and Multiagent Systems, 2004 Retrieved on [May 30, 2003] Retrieved from the Internet: URL<http://dl.acm.org/citation.cfm?id=1018780>.

* cited by examiner

EMBEDDED SYSTEM ADMINISTRATION AND METHOD THEREFOR

RELATED APPLICATIONS

This application is a Continuation of U.S. application Ser. No. 10/895,626 filed on Jul. 21, 2004, now issued as a U.S. Pat. No. 7,725,943 on May 25, 2010, which claims benefit from the Canadian application ser. no. 2,435,655 filed Jul. 21, 2003, now abandoned, re-filed as a Canadian patent application ser. no. 2.475.387 on Jul. 21, 2004, now issued as a Canadian patent No. 2,475,387 on Dec. 14, 2010.

FIELD OF INVENTION

The present invention relates to computing systems, and more particularly to a system and method for system administration.

BACKGROUND OF THE INVENTION

Information Technology organizations are frustrated with the cost of server downtime, the rising frequency of malicious attacks and programs, and the significant operational expenditures required for managing their systems. The complexity and cost of server management is increasing. The server management tasks include: fault diagnosis, software upgrade and patching, backup and recovery, monitoring and resource reallocation. Many architectural solutions to the server management problem have been devised with a variety of hardware and software components; however complete delegation of management authority to the server has not yet been achieved. High levels of human intervention are still required for server management. IBM™ has established a new paradigm in computer networks called "Autonomic Computing™". In short, autonomic computing is an approach to "self-managed" computing systems with a minimum of human interference. A true, complete autonomic system requires that computer systems be reconstructed from software at the high end to hardware components in every computer. In addition to IBM™, Microsoft™, HP™, Dell™ and Sun™ have begun their own autonomic computing initiatives. While "total" autonomic computing may be the ideal its successful and complete implementation will take years. There are alternative approaches that will help increase their systems' uptime, while lowering their systems' Total Cost of Ownership (TCO).

The quickest way to begin reducing the TCO is to attack the area of "least value-add", namely labor. The two most common existing approaches to reducing labor costs are adding additional hardware or additional software.

With regard to hardware based approaches so called "watchdog" cards are inserted into host computers. A separate software process runs on the host, and communicates heartbeats to the watchdog card across the bus. After not receiving a heartbeat for a pre-set amount of time, an on-board timer will expire, causing the watchdog card to cycle the power of the host. Remote Management Cards (RMCs) are add-in server cards that allow system administrators (SYSADMINs) independent access to the server. The key problem with RMCs is that a SYSADMIN is required to intervene if the card detects a problem, thus mitigating any cost savings. Furthermore, RMCs are not autonomic. RMCs are able to scan vast amounts of information, but they are unable to make decisions on their own. RMCs are generally higher-power cards with more powerful CPU (e.g. 200 MHz CPU). This allows a remote system administrator to log into a host machine, and redirect KVM (Keyboard, Video, Mouse) across the remote connection. This facilitates configuration and troubleshooting as though the admin was sitting directly in front of the actual host. Host video and keyboard connectors are actually inserted into the remote management card ports. Most remote management cards offer watchdog timers and functionality.

FIG. 1 is a schematic diagram of a current network administration system. A server system 1 includes a server chassis 2, a server 4, a Network Interface Card (NIC) 6 and a lights out card 10. Communications in the server chassis 2 are provided for by communications bus 16. The lights out card 10 and network administration system 12 are elements of a management system 8. The lights out card 10 provides local control capability, including power, and intercepts for the keyboard, video and mouse. The lights out card 10 further gathers data and invokes simple actions initiated by a remote user. Monitoring of the server 4 is performed by a Host Management Agent (HMA) 14. The observations made by the HMA 14 are sent to the Network Administration System 12. The system 12 receives telemetry data from and provides policy management for the server 4. It will be apparent to one skilled in the art that there may be more than one server and one or more peripheral cards in the sever chassis 2. The system 12 further determines appropriate actions based on the collected information and provides information to a user for evaluation.

Host Monitoring Agents (HMAs) are software-oriented products that are relatively inexpensive and are typically based on industry standards. HMAs reside on a server's primary hardware and operate in conjunction with the host operating system. However, the major drawbacks of HMAs are that they impact host performance (HMAs take away CPU cycles from the server to run monitoring software), are susceptible to host faults (if the host crashes the HMA crashes), and have narrow monitoring visibility (do not monitor internal functions of operating systems and applications). This category of products features software agents that monitor the host system(s). Operational information collected is passed to a separate management station across the network, where it passes through several "filters". Upon successful match by a filter, a response action is initiated, being either a correction action on the host (e.g. restart failed process) or notification (e.g. by email) of a human system administrator.

There have been some recent technologies entering the market that allow a server or desktop to create a protected partition on the host hard drive. In the event of hard drive corruption, the user can essentially replace the master partition with the copy in the protected partition.

There is a need for providing new hardware and software that addressed the issues left unresolved, thereby increasing the availability and reducing the TCO of servers.

SUMMARY OF THE INVENTION

The present invention relates to an embedded administration system.

It is an object of the invention to obviate or mitigate at least one of the disadvantages of existing administration systems.

According to an aspect of the invention an administration system for use within a server system is provided. The server system having a server that provides host management functions and the server system being able to accept computer cards inserted therein. The administration system comprises a computing system that is inserted in the server system, the computing system having a controller that assumes control over the communications bus.

According to another aspect of the invention an administration system for use within a server system is provided. The server system has a server that provides host management functions, the server system being able to accept computer cards inserted therein. The administration system comprises a computing system that is inserted in the server system, the computing system having a controller for performing administration, wherein the controller comprises; a server monitoring unit for monitoring the server and making observations, an analyzing unit for analyzing the observations, a determining unit for determining if a policy violation has occurred, a management unit for assuming host management functions from the server, and an executing unit for executing specific actions.

According to another aspect of the invention a method of performing administration of a server system having a server that performs host management functions by an administration system located within the server system is provided. The method comprising the steps of; monitoring the server, making observations thereof, analyzing the observations, determining if a policy violation has occurred, assuming host management functions from the server, and executing specific actions.

According to another aspect of the invention a server system capable of having at least one computer card inserted therein is provided. The server system comprises a server, the server providing host management functions for the server system, a communications bus providing communications within the server system, and an administration system that is inserted in the server system, wherein the administration card is capable of assuming host management function for the server system.

According to another aspect of the invention a server system capable of having at least one computer card inserted therein is provided. The server system comprises a server, the server providing host management functions for the server system, a communications bus providing communications within the server system, and an administration system that is inserted in the server system, wherein the administration system assumes control over the communications bus.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

The present invention provides a system and method for embedded system administration. Namely, it provides a system and instructions appropriate for assuming control of the host of a server in response to the occurrence of one or more events. Upon assuming control the system assumes host management functions.

Figure 2:
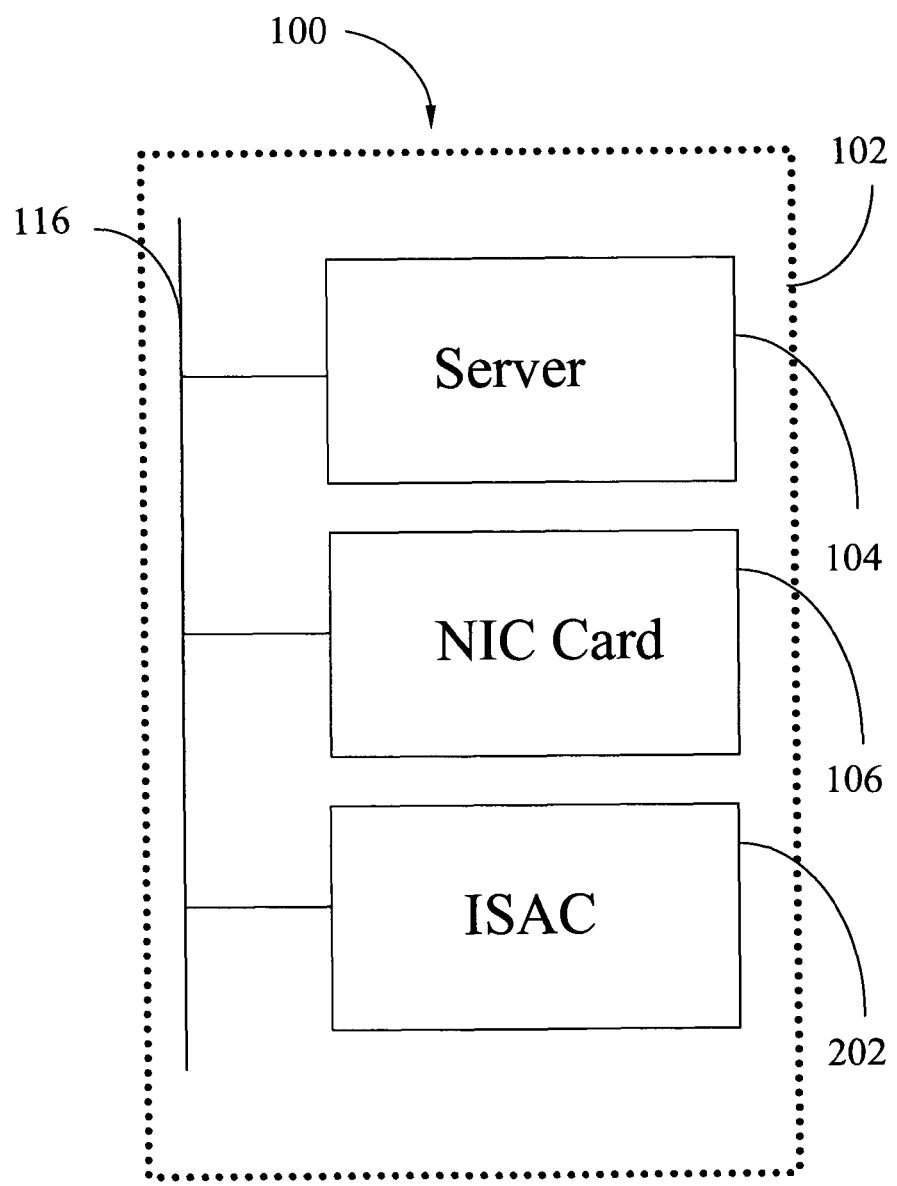
FIG. 2 is a system block diagram of a server system with an administration system according to an embodiment of the invention.

FIG. 2 is a block diagram of a server system according to an embodiment of the invention. The server system 100 includes a server chassis 102 that has a plurality of slots appropriate for accepting peripheral cards therein. These slots, including a slot comprising the server 104, are interconnected with communication buses or channels. These buses are appropriate for providing communications between the components connected thereto. In the current embodiment the communications bus 116 is a PCI bus. It will be apparent to one skilled in the art that the communications bus 116 may be any communications bus appropriate for providing communications between computing systems including PCI-X, USB, IPMB, Ethernet, TCP/IP connection and any other means of communication as would be apparent to one skilled in the art.

The server chassis 102 incorporates the server 104 and one or more peripheral cards that provide for particular functionality. In the current embodiment the server chassis 102 incorporates an NIC card 106 and a card 202 that is appropriate for providing embedded system administration. The card 202 will be referred to as the Intelligent System Administrator on-a-Card (ISAC). The server 104 is appropriate for performing all hosting functions for the peripheral cards provided in the server chassis 102. The server 104, NIC 106 and ISAC 202 communicate with one another using the PCI bus 116.

Figure 1:
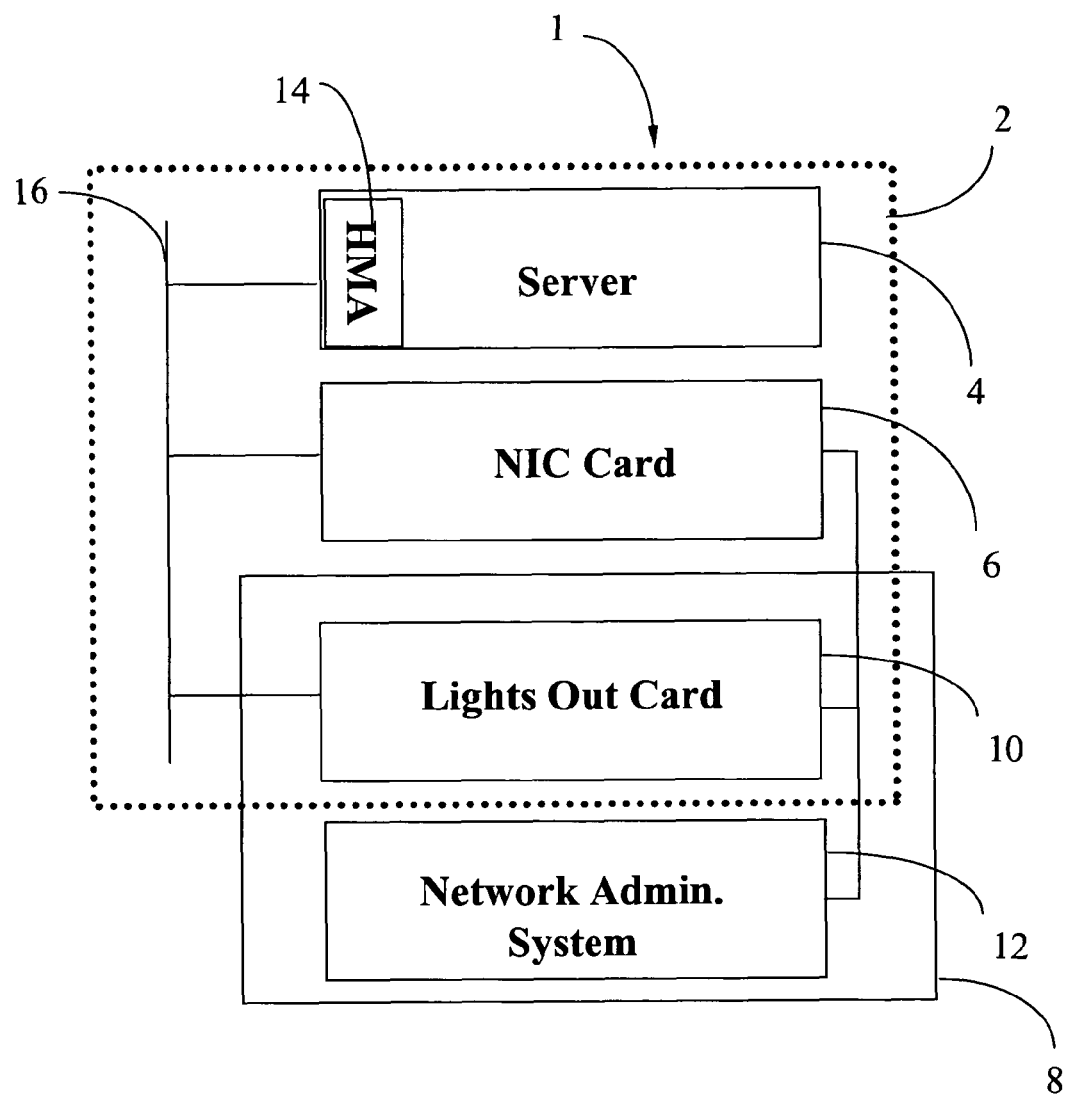
FIG. 1 is a schematic diagram of a server system with a current server management system.

The ISAC 202 is a central element of the system of the present invention. The ISAC 202 includes components appropriate for it to act as a single board computer. The ISAC 202 is inserted into an available bus slot of the server chassis 102. The ISAC 202 is capable of assuming the role of a control plane while subsuming the functions of the network administration system 112 and lights out card 110 functionality, as shown in FIG. 1. The ISAC 202 communicates with the server 104 using the PCI bus 116. The ISAC 202 supports software that provides processing functions for observations made on the server 104.

Figure 3:
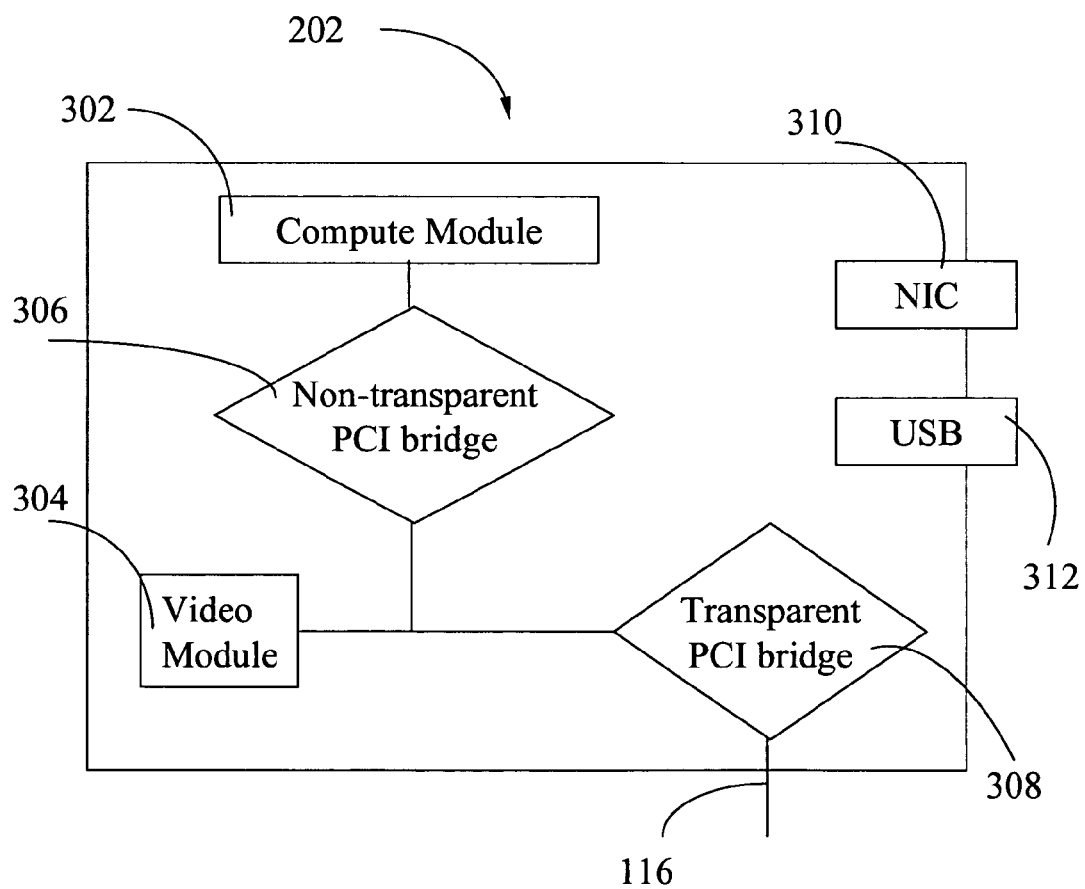
FIG. 3 is a high level schematic diagram of an administration card according to an embodiment of the invention.

FIG. 3 is a schematic diagram that presents further detail of the ISAC 202 and of the communications channels used to communicate with the ISAC 202. A compute module 302 comprises much of the hardware that allows ISAC 202 to function as a single board computer (SBC). In the current embodiment the compute module 302 comprises an XSCALE™ PXA255 processor, 64 MB of DRAM, 64 MB of FLASH and 8 Mb of ROM. The ISAC 202 also has a video module 304, which includes an ATI Rage™ chip set and video RAM. Two PCI bridge chips facilitate bi-directional communication between the ISAC 202 and the server 104. A non-transparent PCI bridge 306 and a transparent PCI bridge 308 form the bridge between the compute module 302 and the communications bus 116. The non-transparent PCI bridge 306 ensures that the server 104 cannot write into the memory space of the compute module 302. The transparent PCI bridge 308 allows video memory of the server 104 to be written to the video memory of video module 304. The ISAC 202 further comprises an NIC interface 310 and a USB interface 308. Standard direct memory access (DMA) mechanisms and interrupt handling techniques familiar to those skilled in the art of video card and network interface card programming are used in the current embodiment of the invention in order to transfer data from the address space of the server to that of the card and vice versa.

Figure 4:
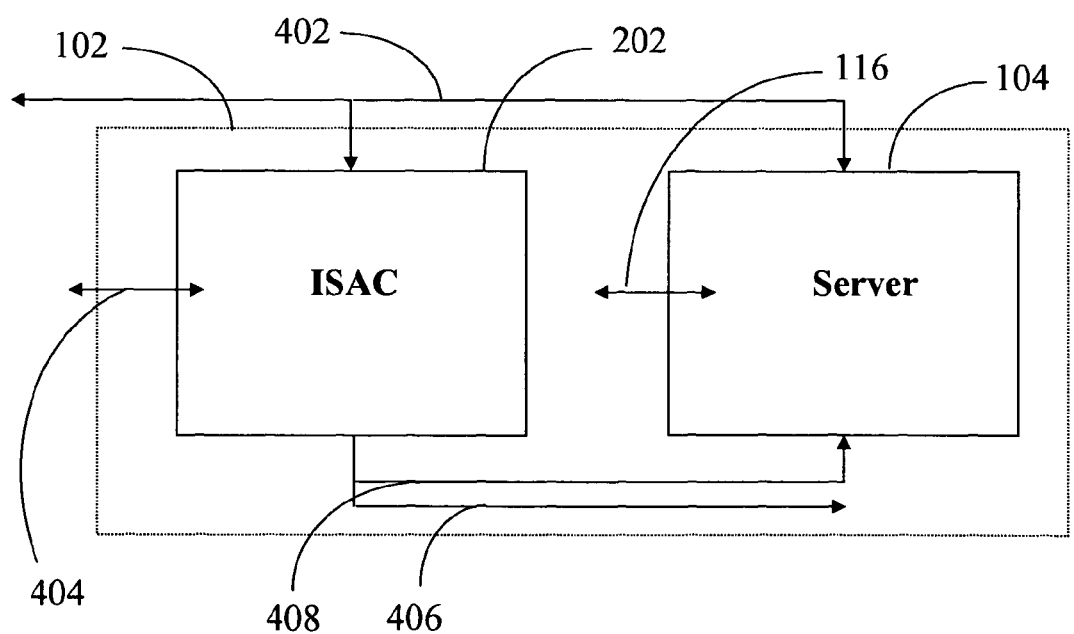
FIG. 4 is a block schematic diagram of the communications channels between a server and an administration card according to an embodiment of the invention.
Figure 11:
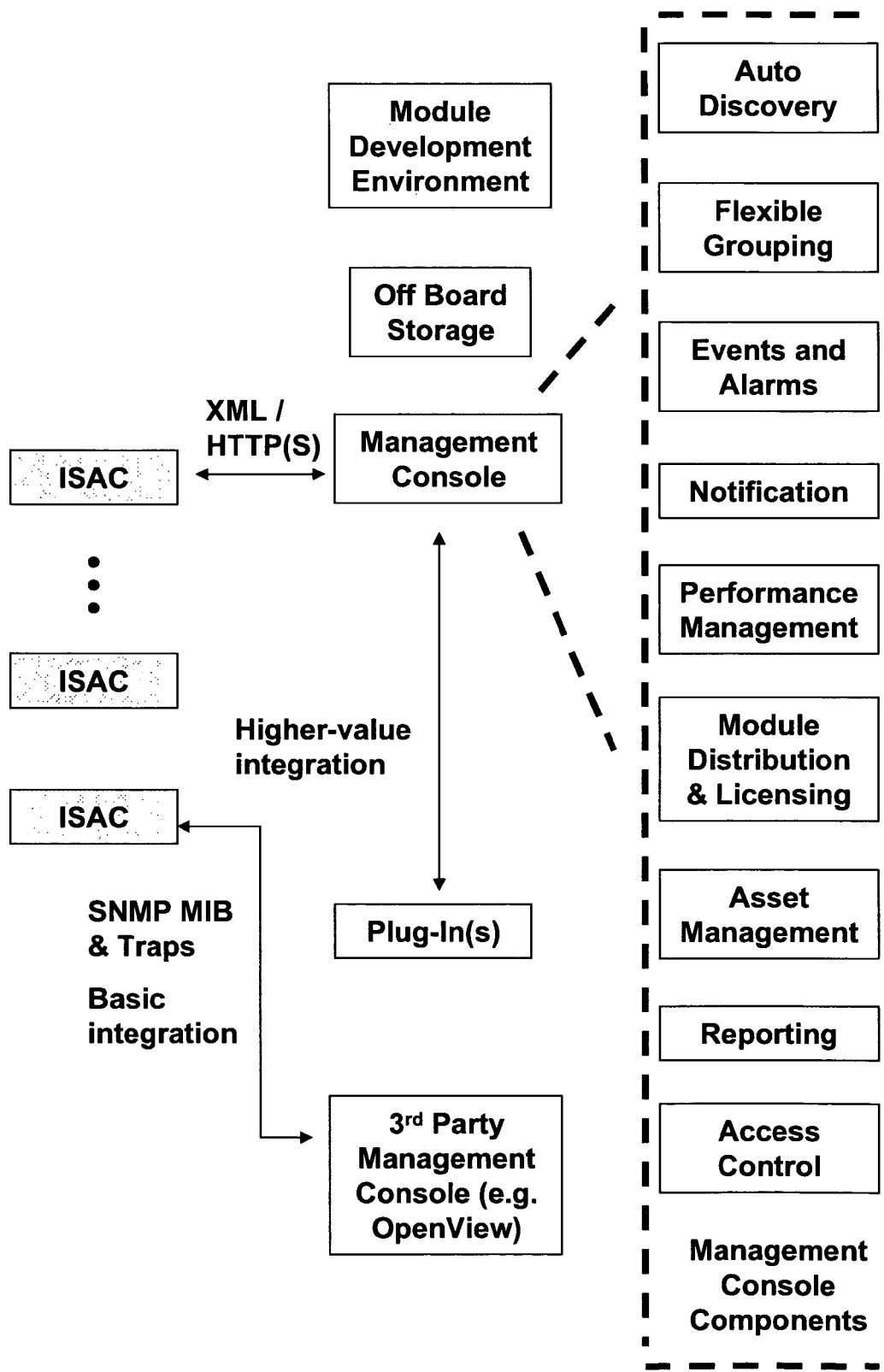
FIG. 11 is a schematic diagram of management of the card according to an embodiment of the invention.

FIG. 4 is a schematic diagram of the communications channels present between the ISAC 202 and the server 104. As indicated in FIG. 4 there are numerous communications channels that can be used for communication with and for control of the server 104, communication with System Administrators (SYSADMINS) and other applications in the current embodiment. The communications bus 116 provides for communication between the ISAC 202 and a host service executing on the server 104. Another communications bus 402 is used as an alternative communications path to a host service operating on the server 104. Port forwarding as provided by the operating system running on the ISAC 202 allows application level protocols such as FTP and HTTP to be redirected to the server 104 using either a communications bus 402 or the PCI bus 116. Port Forwarding is a combination of routing by port combined with packet rewriting. A convention router examines the packet header and dispatches the packet on one of it's other interfaces, depending on the packet's destination address. Port Forwarding examines the packet header and forwards it on to another host (after a little header rewriting) depending on the destination port. In the current embodiment the bus 402 is a TCP/IP connection. It will be apparent to one skilled in the art that a PCI bus may also be used for the bus 402. An alternate computer network 404 provides an interface used by the management software (FIG. 11) for software distribution and control. In the current embodiment of the invention, the network 404 is implemented using a private LAN/WAN through a network interface chip on the ISAC 202 and through a USB dial-out modem. An external notification 406 of state is achieved through light emitting diodes on the back of the ISAC 202. Power control of the server 104 is achieved by electronic simulation of pressing the power switch on the server 104 using a fourth communications bus 408. In an alternative embodiment notifications such as audible indicators of state are provided using a speaker of the server 104

Figure 5:
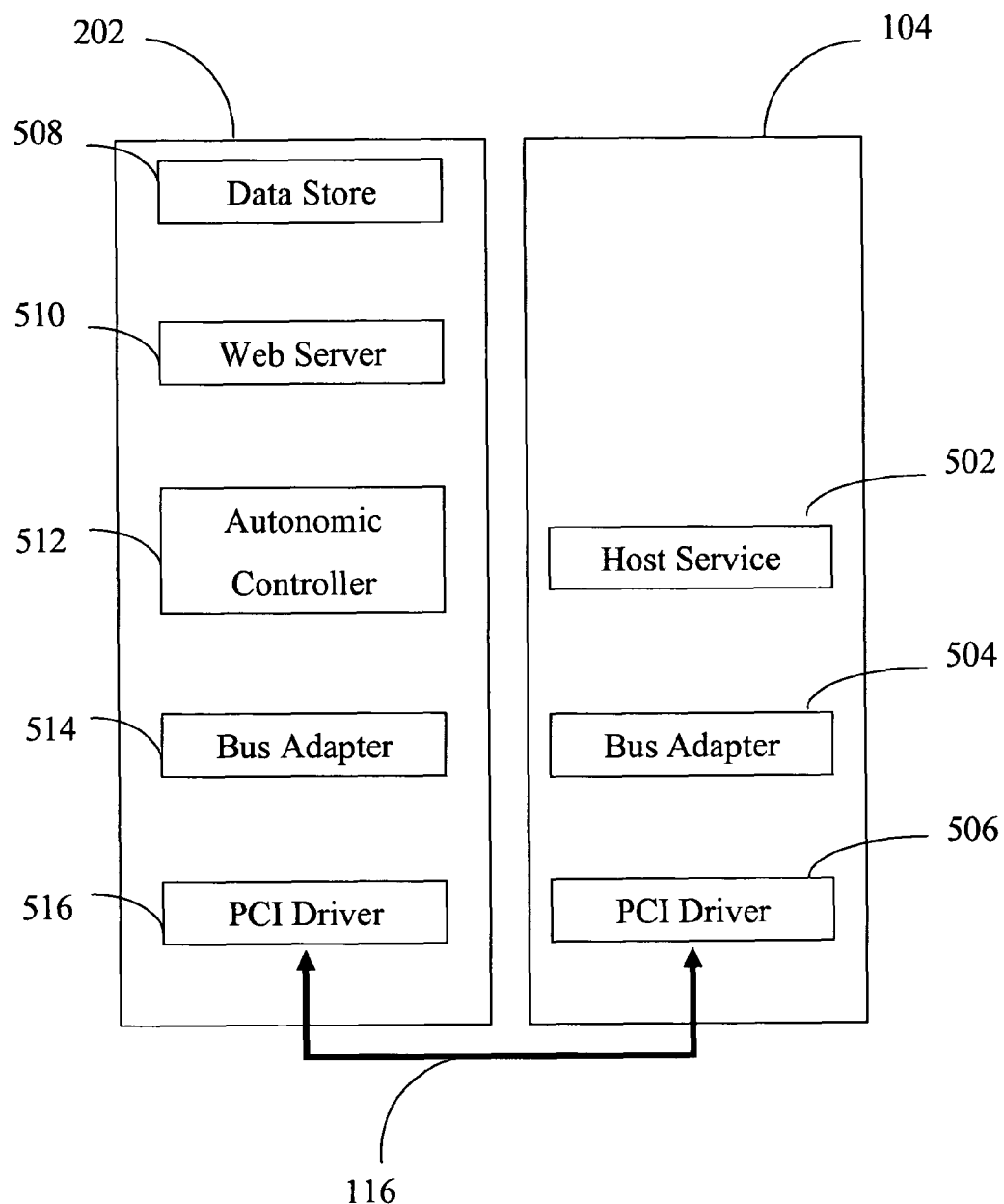
FIG. 5 is a block software architecture diagram according to an embodiment of the invention.

Another element of the system of the current invention is software. FIG. 5 is a block diagram of the basic elements of software residing on the ISAC 202 and the server 104. The elements of software, that are pertinent to the current discussion, executing on the server 104 implement the functionality of host management agent 14 as shown in FIG. 1. There are three software components that reside and execute on the server 104 and provide for the provision of hosting functions by the server 104: a host service 502, a bus adapter 504 and a PCI driver 506. The host service 502 has three main functions. The first function is the acquisition of performance information from managed objects that are part of the server 104, the operating system executing on the server 104, or applications hosted by it. Acquisition of information is achieved by polling and by event notification with polling frequency being determined by software running on the ISAC 202. The second function is to act as a proxy for the ISAC 202, running commands that have been generated by software running on the ISAC 202. The final function of the host software is to facilitate upgrade of the ISAC 202 software. The host service 502 communicates with software on the ISAC 202 by invoking functions within the bus adapter 504. The bus adapter 504 is an implementation of an abstract communications interface providing bus independence and presents an OSI layer 7 interface to the host service 502. Read and write functions are provided. The bus adapter 504 communicates with the PCI driver 506.

The ISAC 202 supports five distinct software components: a data store 508, a web server 510, a controller 512, a bus adapter 514 and a PCI driver 516. In the current embodiment of the invention controller 512 is an autonomic controller. The functions of the bus adapter 514 and PCI driver 516 are equivalent to those provided by the analogous components on the server 104. The web server 510 provides an interface to allow authenticated and authorized users control of the autonomic controller 512. In the current embodiment a Common Gateway Interface (CGI) is used for interaction. It will be apparent to one skilled in the art that servlet interfaces could also be used for interaction. The data store 508 provides persistent storage for information generated by the autonomic controller 512 or by user interaction with the web server 510. In the current embodiment of the invention the data store is a file system maintained in flash memory. The autonomic controller 512 is a programmable software platform that executes policies intended to improve the availability and security of the server 104, its operating system and hosted applications.

The bus adapter 514 provides a hardware abstraction layer, presenting an OSI layer 7 communications interface to the autonomic controller 512. The communications interface provides 8 independent channels: zero through seven. Each channel represents an independent session. Each session has an associated heartbeat; failure to respond to two heartbeats results in the autonomic controller 512 being notified. The communications interface is preemptive, and priority driven based upon channel number; the lower the channel number, the higher the priority of the data sent across it. Channel zero is a control channel; it is used during initialization to ensure protocol compatibility between the ISAC 202 and the server 104. In the current embodiment of the invention, failure to agree on protocol version results in negotiation of a software upgrade that is obtained from an external management console. In the current embodiment of the invention software upgrade is achieved by replacement of a dynamic link library (DLL) on the server side followed by a service restart. In the current embodiment of the invention software upgrade is achieved by replacement of an executable or object class on the ISAC 202 and, if required, an application restart. XML is used to encode the payload of data transferred between the server 104 and the ISAC 202 and vice versa.

Figure 6A:
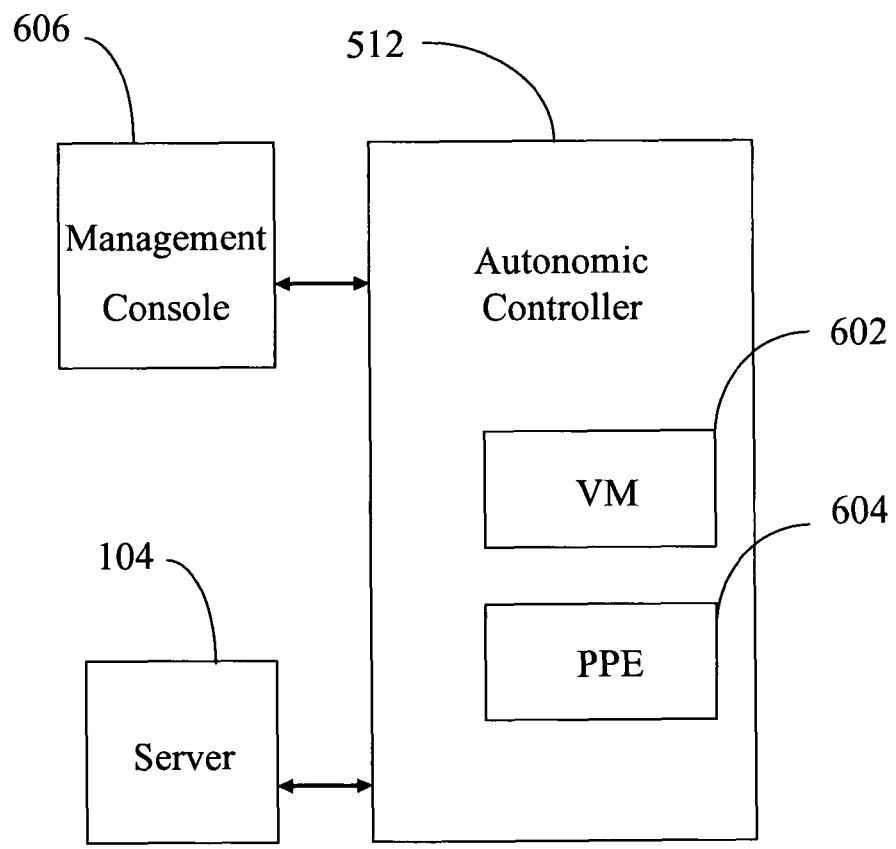
FIG. 6A is a block diagram of an autonomic controller according to an embodiment of the invention.

The autonomic controller 512 is a central aspect of the software of the current embodiment of the invention. As shown in the schematic diagram of FIG. 6A the autonomic controller 512 has a Virtual Machine (VM) 602 which provides an execution environment for the Policy-Processing Engine (PPE) 604 which interprets policies. The VM 602 incorporates an embedded scripting framework. The PPE 604 incorporates pre-programmed policies with default embedded "Best Practices" for server and application management. The current embodiment incorporates a LUA scripting engine; however, it will be apparent to those skilled in the art that other scripting languages could be supported. In addition to the server 104 the autonomic controller 512 interacts with a management console 606. In the current embodiment the management console 606 is a PC based system from which a user can interact with the autonomic controller 512. As such management console 606 provides for the user to view information provided by the autonomic controller 512 and allows the user to transfer information to the autonomic controller 512.

Figure 6B:
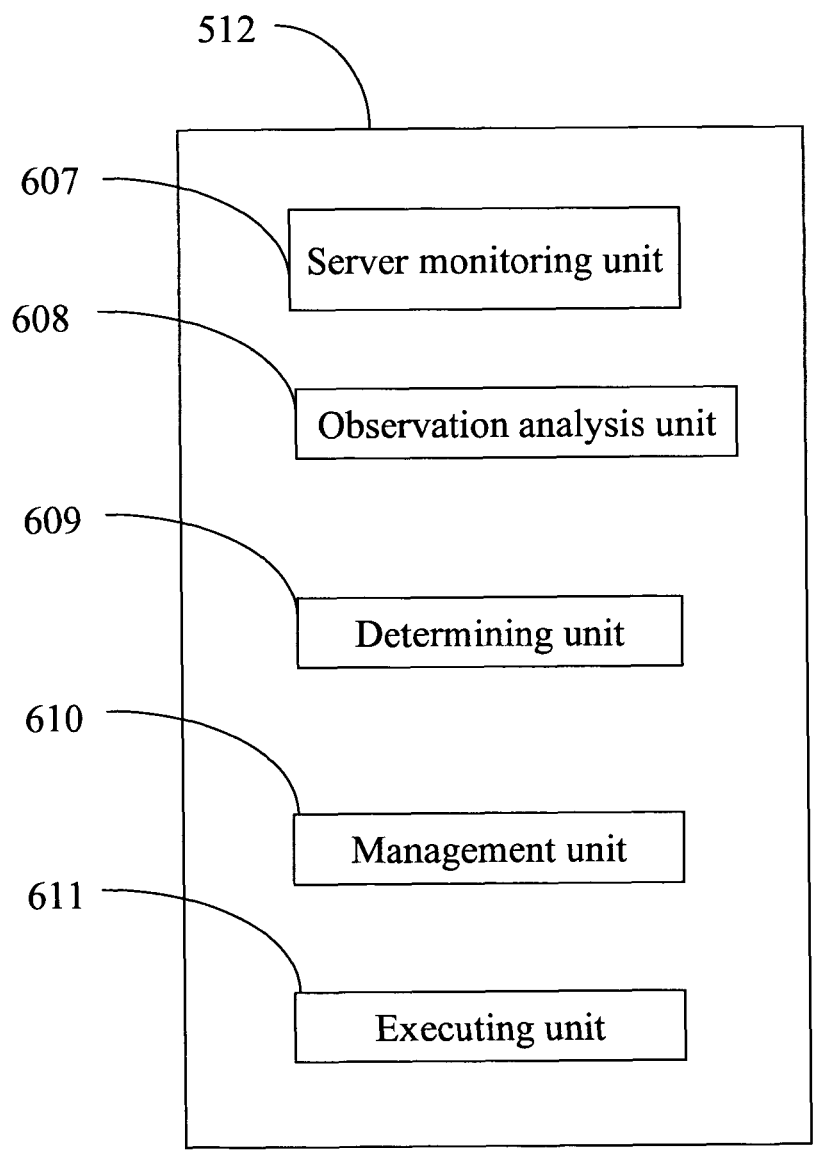
FIG. 6B is a schematic diagram of an autonomic controller according to an embodiment of the invention.

FIG. 6B is a block diagram showing additional units within the autonomic controller 512. The autonomic controller 512 includes a server monitoring unit 607, an observation analysis unit 608, a determining unit 609, a management unit 610 and an executing unit 611.

Figure 6C:
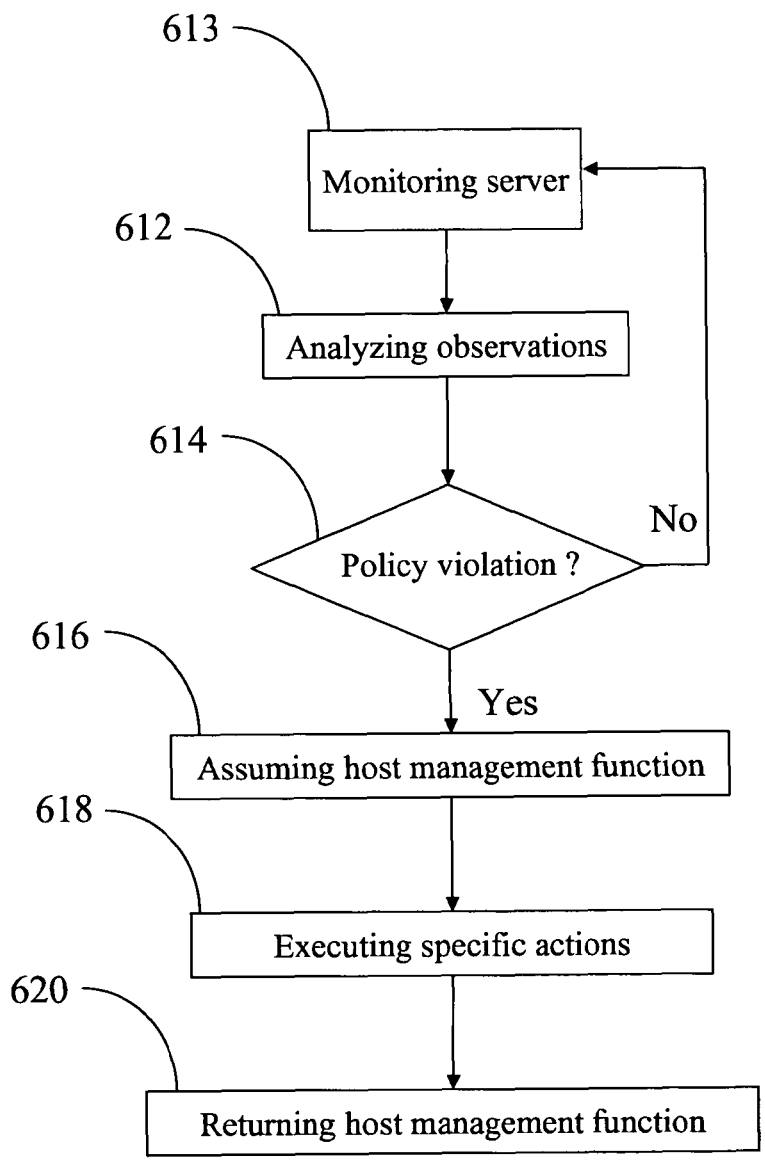
FIG. 6C is a schematic diagram of a server system with an administration system according to an embodiment of the invention.

The autonomic controller 512 is capable of managing the server 104, its operating system and hosted applications. A flow chart of the operation of the autonomic controller 512 according to an embodiment of the invention is presented in FIG. 6C. The autonomic controller 512 monitors the server 104 at step 613. At step 612 the autonomic controller 512 analyzes the observations. At step 614 it is determined whether a policy violation has occurred. If no violation has occurred the autonomic controller returns to step 613. If a policy violation has occurred the autonomic controller plans the workflow. At step 616 it assumes control of host management functions and then executes specific actions at step 618, where host management functions include control over the communications bus 116. Thus, the autonomic controller 512 controls the communications bus 116. Host management functions are returned to server 104 at step 620.

The above capability is provided through the execution of Intelligent Control Loops (ICLs). The ICLs are broken down into four distinct parts: monitor, analyze, plan, and execute. ICLs are based on modules that describe policies; carrying out tasks as efficiently as possible based on high-level, declarative statements of intent (or state). Policies are implemented using software that is adaptive and can be modified in real time using the web server interface 510. Policies are driven by event input that is derived from observations made on the server 104, its operating system and its hosted applications.

With regard to the above the deployed unit of autonomic behaviour is a module. The module represents a set of one or more policies that together implement one or more ICLs. The policies are implemented as independent sets of rules. They are the smallest unit of autonomic behavior that is understood by the VM 602 and evaluated by PPE 604.

Observations are typically measurements of resource consumption; e.g. CPU utilization. ICLs are responsible for the collection of information from server 104 by making observations on managed objects, processing and filtering the raw observations and using the processed observations to make decisions concerning the state of server 104 being intelligently managed. Processed observations are aggregated until an event is considered to have been triggered; e.g. the CPU utilization has exceeded 90% for 60 seconds and paging space is low. Actions are then executed; making adjustments as needed—installing missing or compromised software, adjusting server control parameters, restarting failed server elements, adjusting current workloads, and taking resources offline to prevent system corruption through intrusions. The set of actions undertaken constitutes workflow; i.e. it is intended that all actions complete successfully. ICLs are designed and implemented offline using a development environment and distributed using system management tools and embedded in system resources. A forward chaining rule based inference engine that uses the Rete algorithm is used to determine context based upon events received.

The deployed unit of autonomic behavior is a module. A module represents a set of one or more policies that together implement one or more ICLs. Users may extend modules. Extension takes three forms: customization, configuration and programming. Modules represent sets of "Best Practices" captured from Microsoft™ and other vendor product knowledge bases as well from experienced SYSADMINS. LUA was chosen for policy implementation because of its compact embedded footprint and its similarity to traditional scripting languages. A rules-based embedded environment has also been constructed that compiles down to Java byte code thereby, making it possible to make use of any available class supported by the virtual machine. An embodiment of the invention uses the J9 JVM implementation using the CDC configuration and Foundation Profile for the autonomic controller 512.

The autonomic controller 512 has several functions, implemented using a service-oriented framework in the current embodiment of the invention. The principal services are: host communications, management console communications, module and policy management, short term and long term memory management, alarm management, notification, health monitor management, managed object management, properties management, software management, logging, audit, security, scheduling, and task management. All services have an associated lifecycle, meaning that they can be initialized, started and stopped. Certain services are managed services, meaning that they are monitored for operational integrity. The host communications service performs three functions: management of the lifecycle of communications between the ISAC 202 and the server 104, monitoring its integrity through a heartbeat mechanism and reliably transferring data between the two. The management console communications service provides an abstract interface for the communications between the ISAC 202 and the management console 606. In the current embodiment of the invention the HTTPS protocol is used for transport, with XML being used for payload description. Module and policy management services ensure that modules and policies can be loaded from persistent storage. In the current embodiment of the invention a file system is used with a known, rooted directory structure. Each directory within the modules directory is considered a module to be loaded into the running autonomic controller 512. Loading requires that several files be read, and objects created within memory of the compute module 302. In the current embodiment of the invention, all loaded modules conform to the Modules interface and all policies associated with a module conform to the Policy interface. Module and policy interfaces refer to software contracts; i.e. behavior that the implementations must support. Once loaded, modules and policies are initialized, started and then registered with the managed object management service in order that the management console 606 can interact with them. Short and long term memory services allow objects to be remembered for the autonomic controller session or indefinitely respectively. Alarm management provides the facility for alarms to be externally communicated. Alarms are generated as a result of policy actions being executed. Practitioners skilled in the art of Network Management will understand that alarms have SET and CLEAR states, the former being created when a policy violation is observed, the latter being generated when the server 104 returns to an acceptable state. The expected semantics for alarm usage is that a SET can only be followed by a CLEAR. The notification service provides an abstract interface for sending notifications to applications off of the ISAC 202. In the current embodiment of the invention, e-mail, window pop-ups and instant messaging notifications are provided. Notifications are generated as a result of policy actions being executed. The health monitor management service provides a facility that allows a user to see an iconic representation of the health of the server 104, some aspect of the operating system or its hosted applications. In the current embodiment of the invention a SYSADMIN can view the iconic representation using the web interface 510. Health monitor indicator changes are generated as a result of policy actions being executed. The managed object management service allows any object within server 104 to be managed by the management console 606. Interfaces to get and set attributes as well as public invoke operations on managed objects are provided. The management console 606 may also register for events of interest to be forward when changes to managed objects occur.

In an alternative embodiment the managed object management service will use a Common Information Model Object Manager (CIMOM) for its implementation. The managed object management service interacts with the security and audit services in order to ensure that only authorized individuals can access managed resources and that any such access can be traced. The properties management service listens for changes to properties that apply to objects being managed. Properties are stored persistently in the file system. When an object with properties is loaded, the properties management service listens for changes to the file. If detected, the object is notified that it should reload its properties. The software management service manages the process of updating a class in the system; only services may be updated in the current embodiment of the invention. The software management service ensures that the affected service is stopped, its current state retained, a new service object created, and the retained state transferred to the new object. Finally, the service is restarted. The logging service allows time-stamped information, events and loggable objects to be written to persistent storage. The audit service is a special logging service that is intended to store actions of security interest. The security service has the responsibility of answering authorization questions; namely, is a particular user allowed to perform a specific action on a resource? The scheduling service allows an operation to be scheduled for some time in the future either on a one-time or recurring basis. Finally, the task management provides a pool of threads for use by all other services. This service avoids the need to create threads every time concurrent activity is required.

Figure 7:
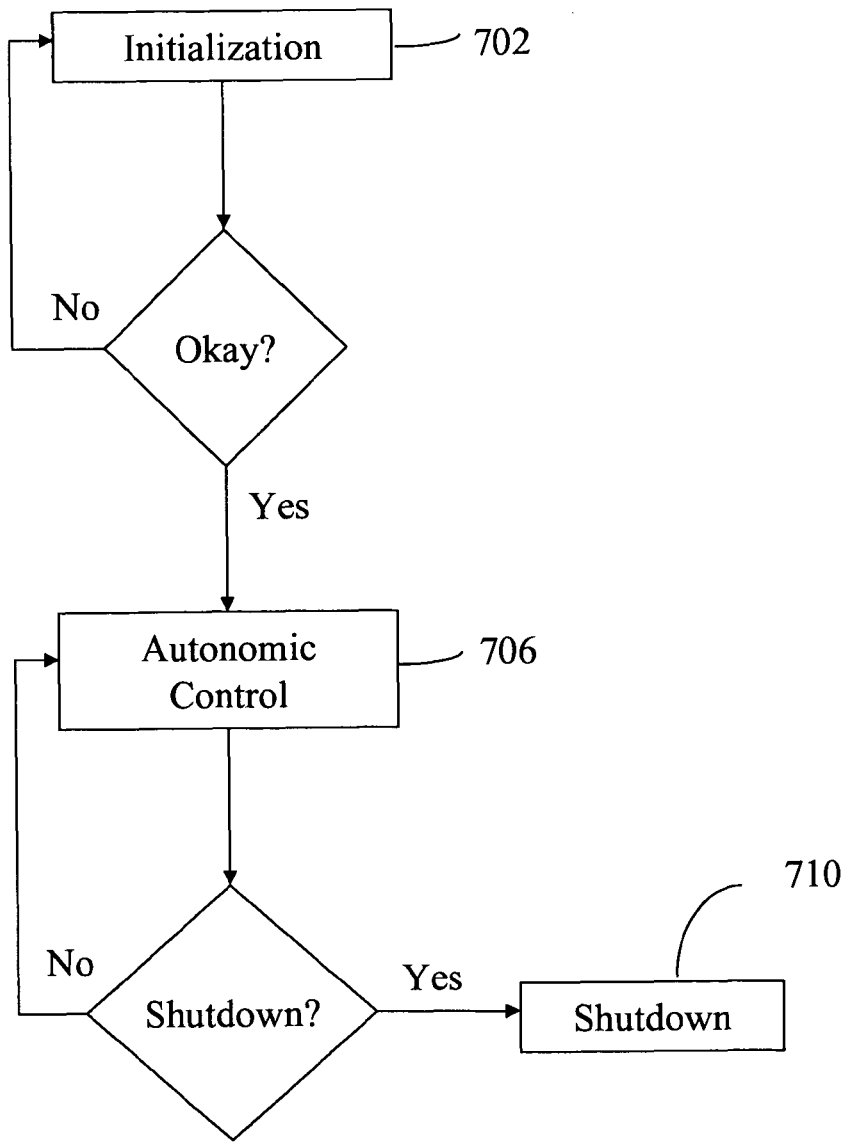
FIG. 7 is a high level flow chart of life cycle operation of the autonomic controller according to an embodiment of the invention.

FIG. 7 is a flow chart of the basic states of the operation of the autonomic controller 512. The autonomic controller 512 has three main states: initialization 702, autonomic control 706 and shutdown 710. The initialization 702 and shutdown 710 states are transient with the autonomic controller spending the majority of its time in the autonomic control state 706.

The autonomic controller 512 enters the initialization state when the ISAC 202 is rebooted. If the initialization process is successful, a transition is made to the autonomic control state 706. If the initialization process is unsuccessful, several further attempts will be made to initialize the autonomic controller 512. Policy activity may result in the need to shutdown and restart the autonomic controller 512 and possibly reboot the ISAC 202. In this case, the autonomic control state 706 is exited. If shutdown can proceed, the shutdown state 710 is entered and shutdown executes. If not, the autonomic control state 706 is re-entered until such time as shutdown may proceed.

Figure 8:
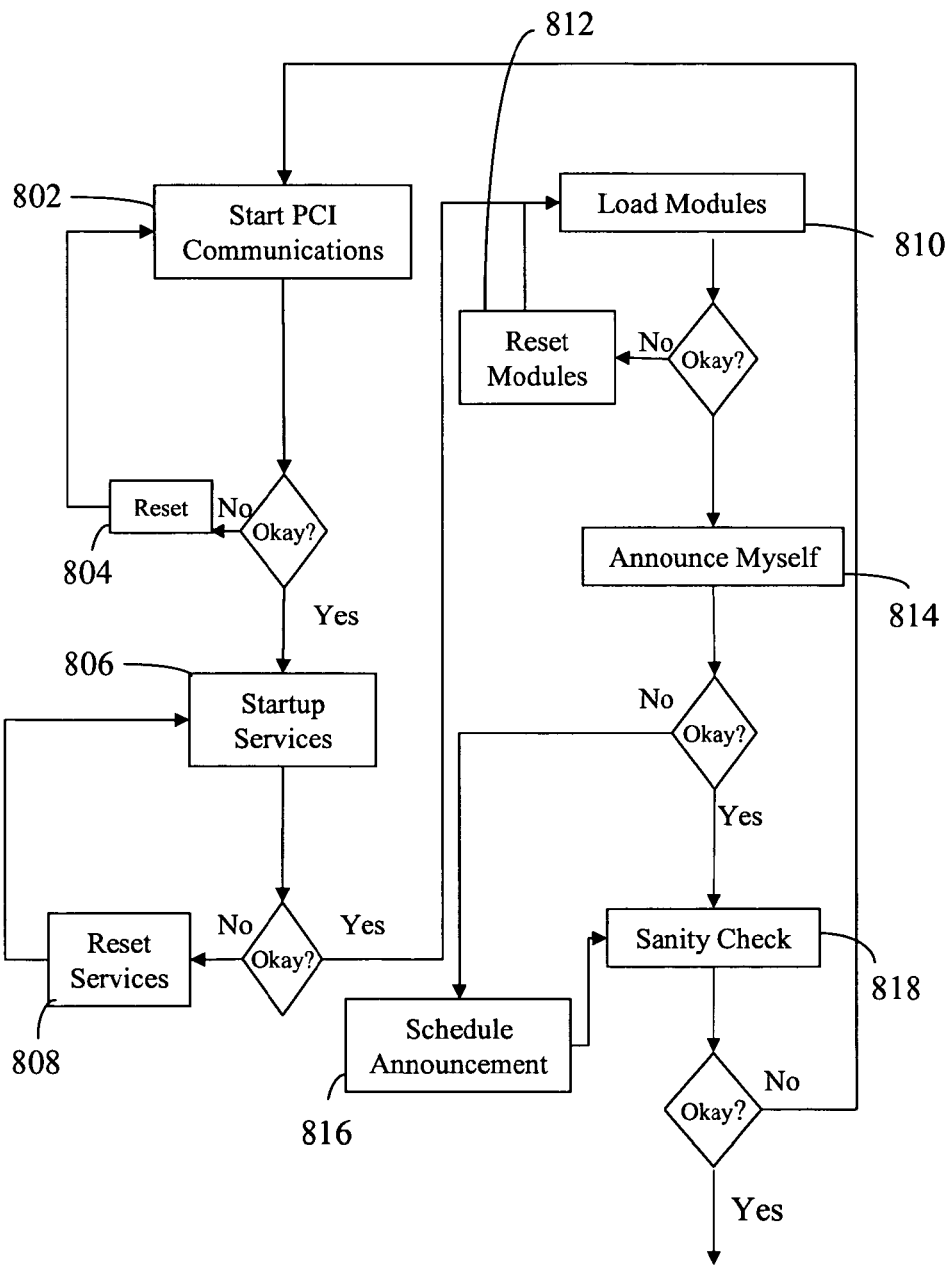
FIG. 8 is a flow chart of initialization of the autonomic controller system according to an embodiment of the invention.

FIG. 8 is a schematic diagram of the autonomic controller's initialization process. There are five main steps in the initialization process. A start PCI communications step occurs at step 802. There are generally five sub-processes in the start PCI communications step 802. First, an open request is made. This API initializes data structures within the bus adapter 514; the PCI driver 516 is contacted and channel zero is used in order to send a message containing version information of the PCI driver 310. This information is received by the PCI driver 506. This is a blocking call as no activity can occur on the bus 116 until an agreed version has been negotiated. If the versions agree, a channel number in the range 1-7 is returned. Failure is indicated by a negative integer. If version numbers do not agree, and the ISAC 202 is to upgrade, the PCI driver 516 is reset at step 804, the management console 606 is contacted and the upgraded driver is downloaded. The old driver module is then unloaded and the new driver loaded. A new attempt to start PCI communications then occurs i.e. returned to step 802. Failure to start PCI communications after an upgrade causes a soft restart of the autonomic controller 512. Failure to start PCI communications after an upgrade and a restart of the autonomic controller 512 causes an alarm to be sent to the management console 606 and the ISAC's 202 operating system to be rebooted. If an upgrade of the PCI driver 506 is required the management console 606 is contacted and the upgraded driver is downloaded. The old driver module is then unloaded and the new driver loaded. A new attempt to start PCI communications then occurs i.e. returned to step 802. The host service 502 is restarted. Failure to start PCI communications after an upgrade to the PCI driver 506 causes the server 104 to be rebooted.

Once PCI communications have been established, the services stored in the services.ini properties file in the root directory of the application installation are read in at the startup services step 808. This file has the format "name=serviceclass". An instance of each service is created with the name indicated, and its associated properties read in. The service instance is initialized with the properties stored in the properties directory; the file <name>.ini is read in. Once successfully initialized, the dependent services are checked. If all services on which the loading service depends are in the started state, the loading service is started. If not, the loading service is scheduled for a later start. Once initialized, a service registers with the managed object management service and logs its state. The managed object management service is a bootstrap service and is not loaded from the services.ini file. The service manager is another bootstrap service that provides lookup services for the autonomic controller. If any service fails to start a log is written using a best effort logging service, which may result in a simple write of a string to stdout. The first time services fail to start a service reset takes place at step 808. The second time services fail to start, the autonomic controller 512 continues without the affected service. Following service startup, modules are loaded from the file system at step 810. The modules directory from within the root directory of the installation is read. Each directory within the modules directory contains a "Best Practices" module.

Module loading at step 810 consists of three sub-processes: load policies, load events and link events to policies. Loading policies consists of reading the policies directory within the current module directory. Policies are then loaded by reading each .ini file found in the directory. Each .ini file contains several properties, including name, description, the policy class and the class of the knowledge base which implements it, along with one or more names of event sources that it consumes. Loading a policy consists of creating an instance of the policy class and associating an instance of the knowledge base with it. In the current embodiment of the invention, knowledge bases are implemented using simple forward chaining rules. Loading events consists of reading the events directory within the current module directory. Events are then loaded by reading each .ini file found in the directory. Each .ini file contains several properties, including name, description, the event generator class and the class(es) of one or more observation processors, along with one or more names of observation sources that it listens to. Observation processors are objects that take raw observations and aggregate them to generate events. For example, an event generator might listen to CPU utilization observations and an observation processor might report the average over the last 10 observations. This average might then be pipelined into another processor that looks at whether a threshold has been exceeded. Loading an event consists of creating an instance of the event class and associating observation processor instances with it and starting observation tasks. The mechanism of observation processing, observation aggregation and event generation will be further described during the explanation of the autonomic control state shown in FIGS. 9A and 9B. Starting an observation task involves communicating with the server to set up either a polling frequency for observation delivery; e.g. "tell me the value of CPU utilization every 30 seconds" or registration for event notification; e.g. "tell me when a new user logs in" or "tell me when a log is written to the event log". The final sub-process associated with module loading is linking. In this process, the names of the event sources associated with policies are resolved to the event generator objects created when the event sources were loaded. Module loading is considered successful if (a) all classes are successfully instantiated (b) all properties files can be read and (c) all event names can be resolved. All loading errors are logged. Failure to load a module on the first initialization pass causes that module to be unloaded and the module reloaded without policies or event sources that generated errors, this is considered the step of resetting modules i.e. step 812. Reloading of modules continues until no further errors are detected. Once modules have been loaded, the autonomic controller 512 announces itself to any management console that it knows about at step 814. Known management consoles are found during the BOOTP/DHCP protocol or through SYSADMIN card configuration. Failure to configure a management console URL locally or through DHCP parameters means that the card does not automatically announce itself. If the card is unable to announce itself it tries periodically to obtain information using DHCP. The final step of initialization is a sanity check i.e. step 818. During this check all services are checked for the "in service" state and that all event sources are functioning correctly.

Figure 9A:
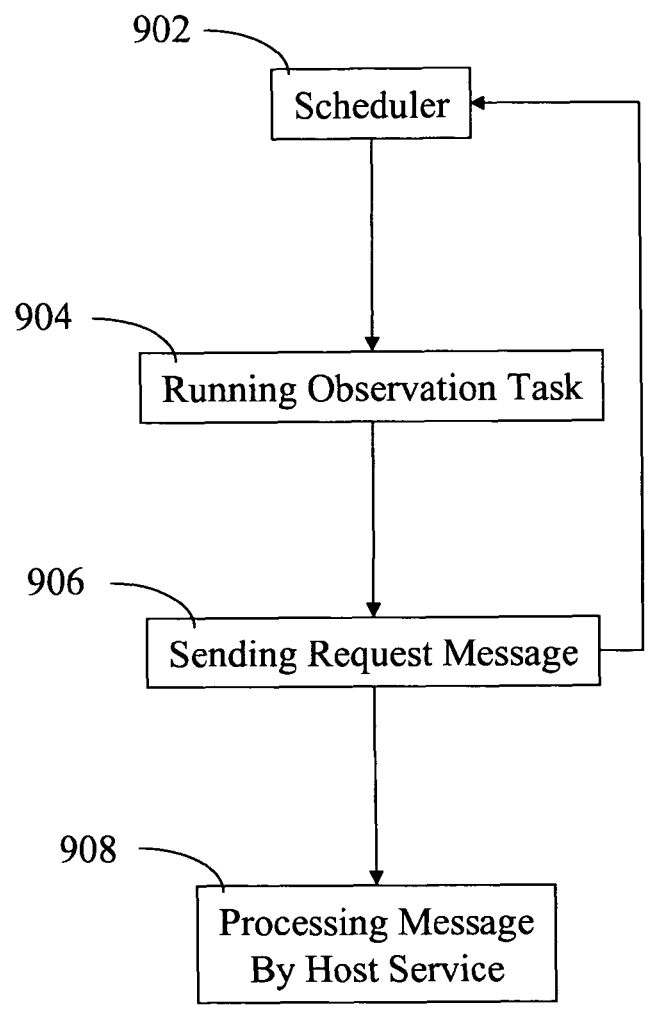
FIG. 9A is a flowchart of the operation of the autonomic controller according to an embodiment of the invention.

Once the autonomic controller 512 is initialized, tasks associated with monitoring the server 104 are executed. FIG. 9A is a flow chart of the process of providing a request to the host service according to the current embodiment of the invention. The autonomic control process is driven by observations made on the host service and communicated asynchronously via the PCI bus 116. Observations may either be polled or notified with observations being made by observation tasks. In the case of a polled observation, at step 902 an observation task is scheduled to run periodically and is registered with the scheduler service during module loading. The observation task is run at step 904. When observation tasks run they send a request message, using the host communications manager, to the host service 502 running on the server 104 requesting performance information at step 906; e.g. CPU utilization. The message is delivered to the host communications service (Host Manager), where it is queued. It is noted that a separate thread is used to deliver the message. The message is then processed by the host service operating on the server 104 at step 908.

Figure 9B:
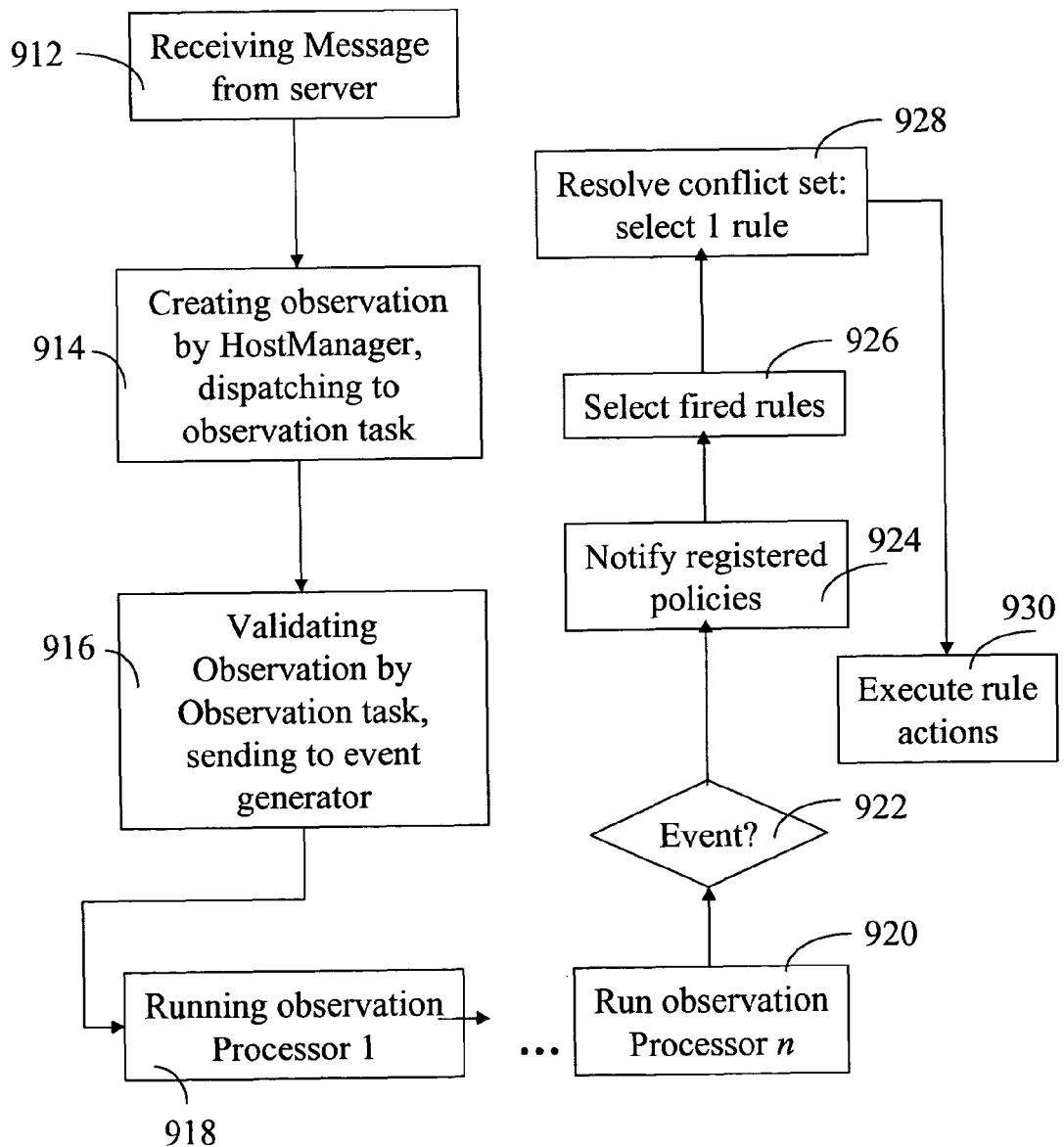
FIG. 9B is a flowchart of the operation of the autonomic controller according to an embodiment of the invention.

FIG. 9B is a flow chart of the process of receiving a response from the host service of the server 104 by the autonomic controller 512. The request is non-blocking and returns immediately at step 912, providing a message identifier for the transaction. When the performance information is available, a callback is invoked within the host communications manager service. The HostManager creates an observation and dispatches the message to the observation task object using the message identifier provided for the initial request at step 914. The message is converted to an observation by the observation task; observations are name, value pairs. The observation is then validated by the observation task at step 916. The event generator with which the observation task is associated is then notified of a new observation and the observation is sent to the event generator. Observation processor 1 is then run at step 918. Each observation processor associated with the event generator processes the observation in turn at step 920. Using the CPU Utilization observation as an example, the first observation processor may adjust the utilization value to represent the average over a sliding window of several minutes; the second observation may implement a tripwire that indicates whether the value exceeds a threshold, only returning the observation in the event that the value is exceeded and null otherwise i.e. at step 922 it is determined whether an event has occurred. Observation processors represent a pipe and filter model of processing that is familiar to those skilled in the art of UNIX systems programming or the design of the JXTA peer-to-peer framework. After all observation processors have accessed the observation, and the observation is non-null, the event generator creates an event from the observation and notifies all policies that have registered an interest in it at step 924. Each policy processes the event in turn, and may modify it. In the current embodiment of the invention, policies are implemented using a knowledge base consisting of rules, which are processed using a Rete forward chaining algorithm. This algorithm will be familiar to individuals skilled in the art of Expert Systems. The event is inserted into the knowledge base and the Rete algorithm runs, with zero or one rule being chosen to fire. Code associated with a simple process-termination policy is shown below:

```
package com.symbium.jeops;
import com.symbium.utility.ErrorLogger;
import com.symbium.Event;
import java.util.Properties;
import com.symbium.services.*;
public ruleBase HostProcessManagementPolicy {
  rule TerminationHostProcessRule {
    declarations
      Event e;
      Properties p;
    conditions
      p.containsKey(e.getProperty("process"));
      e.getProperty("state").equals("start");
    actions
      HostManager hm = ServiceManager.lookup("HostManager");
      String[ ] args = { e.getProperty("process") };
      hm.sendCommand("stopprocess", args);
      Logger.log(1,
      e.getProperty("process")+"    "+e.getProperty("state"));
  }
}
```

The event being processed is shown in the declarations as "e"; the processes to be prevented from running are stored in the properties "p". The conditions for the rule state that, "If the process name that has been started is contained in the list of processes that are to be prevented from running, the TerminationHostProcessRule is true". When proven to be true, the actions associated with the rule are executed. In this case, the host management service is looked up. A stop process command is then sent to the host using this service, which will terminate the process. Finally, a log is written to the logger containing the process name and the fact that it was started.

To summarize; the autonomic control state of the autonomic controller 512 implements a sense-act cycle. Sensors are implemented using observation tasks that either poll the server or are notified of changes in the state of the server. Observations are abstract objects that are server, operating system, and application neutral. Observations are aggregated by event generators, where they are processed and distributed as events to registered policies. In the current embodiment of the invention policies process events use knowledge bases. According to alternative embodiments knowledge representations such as Fuzzy Logic, Neural Networks or Finite State Machines are used.

Figure 10:
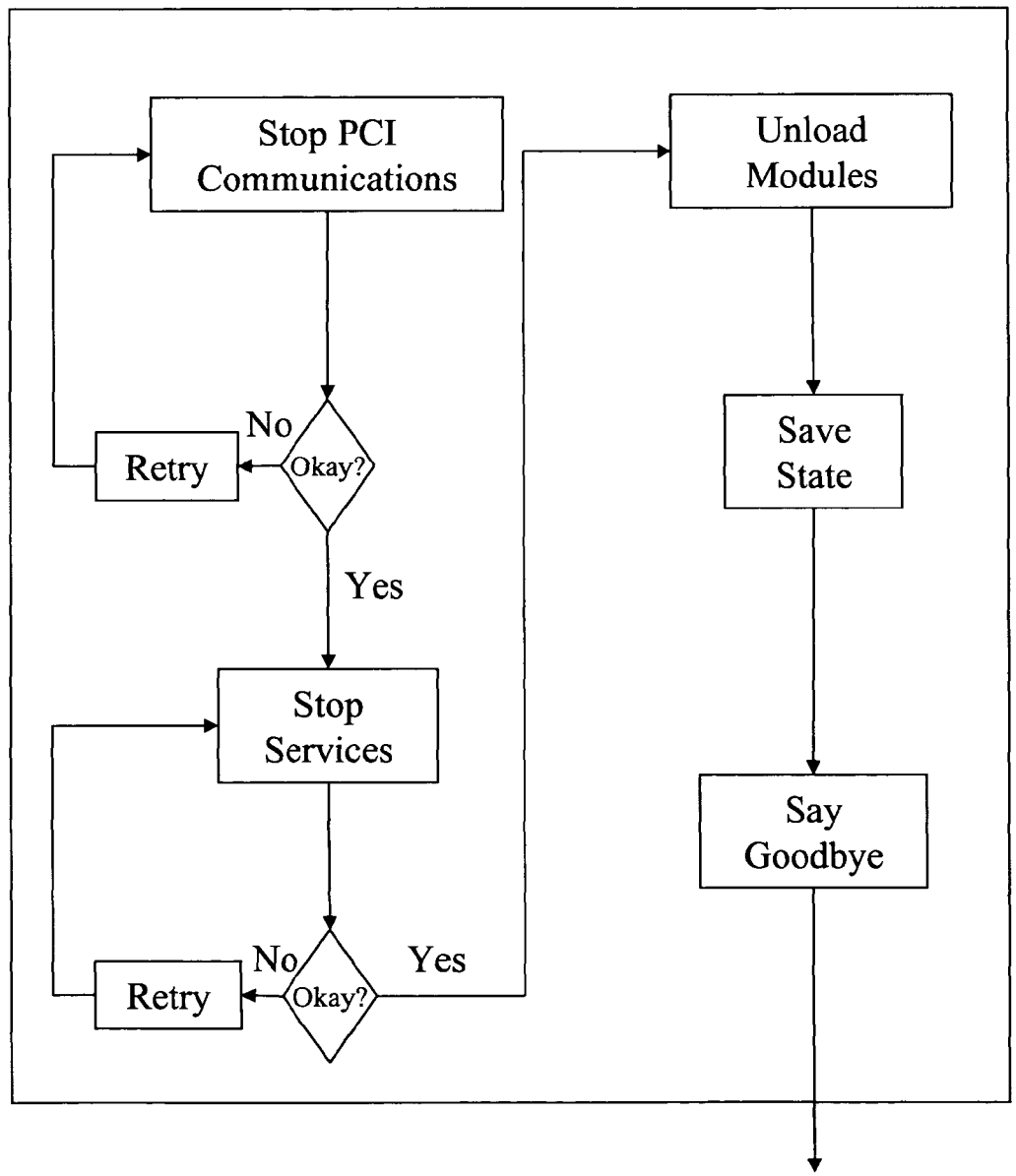
FIG. 10 is a flow chart of the shutdown process of the autonomic controller according to an embodiment of the invention.

FIG. 10 is a flowchart detailing the shutdown process i.e. step 710. The first step of the shutdown process 710 is the step of stopping PCI communications at step 1004. A control message is sent indicating that the autonomic controller 512 is going off line. The host service 502, acting as the host, acknowledges this message. If negatively acknowledged, the message is repeated at step 1006. If the message remains unacknowledged or is negatively acknowledged for more than a user-defined period of time, the shutdown process proceeds. A stop services step 1008 simply invokes the stop lifecycle API on each service in turn. If a service fails to stop, a best effort log is generated and an attempt is made to stop it again, at step 1010, after a user-defined period of time. If the service fails to stop after a user-defined number of attempts, the shutdown process proceeds. An unload module step 1012 invokes the stop lifecycle API on each module in turn. The module stop API invokes the stop lifecycle API on each policy and event in turn. The policy stop lifecycle API releases allocated resources, including closing open files and saving their state persistently at step 1014. The event stop lifecycle API invokes the stop lifecycle on observation processors and tasks thereby allowing these objects the ability to release resources allocated by them. Once all modules have been unloaded, the autonomic controller 512 sends a goodbye message at step 1016 to all known management consoles. It then shuts down.

Figure 12:
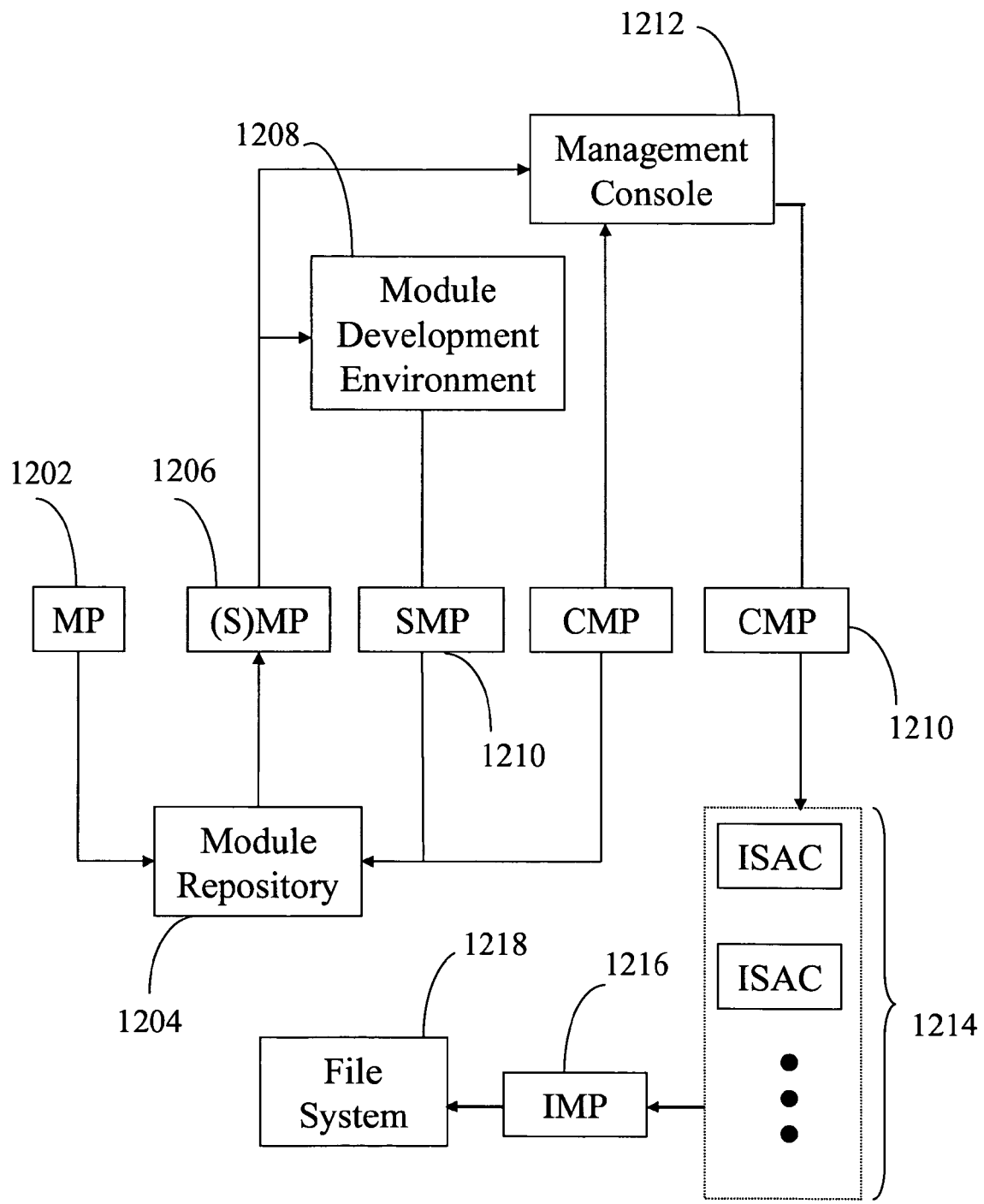
FIG. 12 is a schematic diagram of the lifecycle of a module according to an embodiment of the invention.

FIG. 12 is a schematic diagram illustrating the role of Module Development Environment (MDE) software in the lifecycle of a module. In the current embodiment the MDE software executes on the same platform as that on which the management console software executes. Modules may be altered in two distinct ways; they may be configured and extended. Configuration involves the specification of new or modified data; e.g. an altered e-mail address. Extension involves policy changes such as the addition of modification of rules. The MDE has 2 primary functions. It can be used to create new modules and modify modules already in service. The MDE provides a visual programming environment that significantly reduces the barrier to entry for module developers. The MDE can take a Module Product (MP) 1202 delivered via the web or from CDROM and specializes it. This MP will generally be stored in a module repository 1204. The MP is provided to the MDE at 1208 where it is specialized, forming a Specialized Module Product (SMP) that can also be stored in the Module Repository 1204 maintained by the user. MPs inherit behavior from MPs, overriding "Best Practices" where appropriate for the user. Inheritance allows user behavior to be retained when a new version of the module is made available to the user. The MDE 1208 can also be used to create MPs. MPs or SMPs are provided to the management console 1212 where they are edited and configured in a custom manner; e.g. specify a default e-mail address for notification or a specific target for a window pop. These Configured Module Products (CMPs) 1210 are saved and distributed to one or more ISACs 1214. Once installed on an ISAC, the Installed Module Products (IMPs) 1216 are saved in the file system 1218. IMPs contain information that is gathered automatically during the module installation process; e.g. number and type of printers. IMPs are loaded when the card initializes as shown in FIG. 6.

Figure 13:
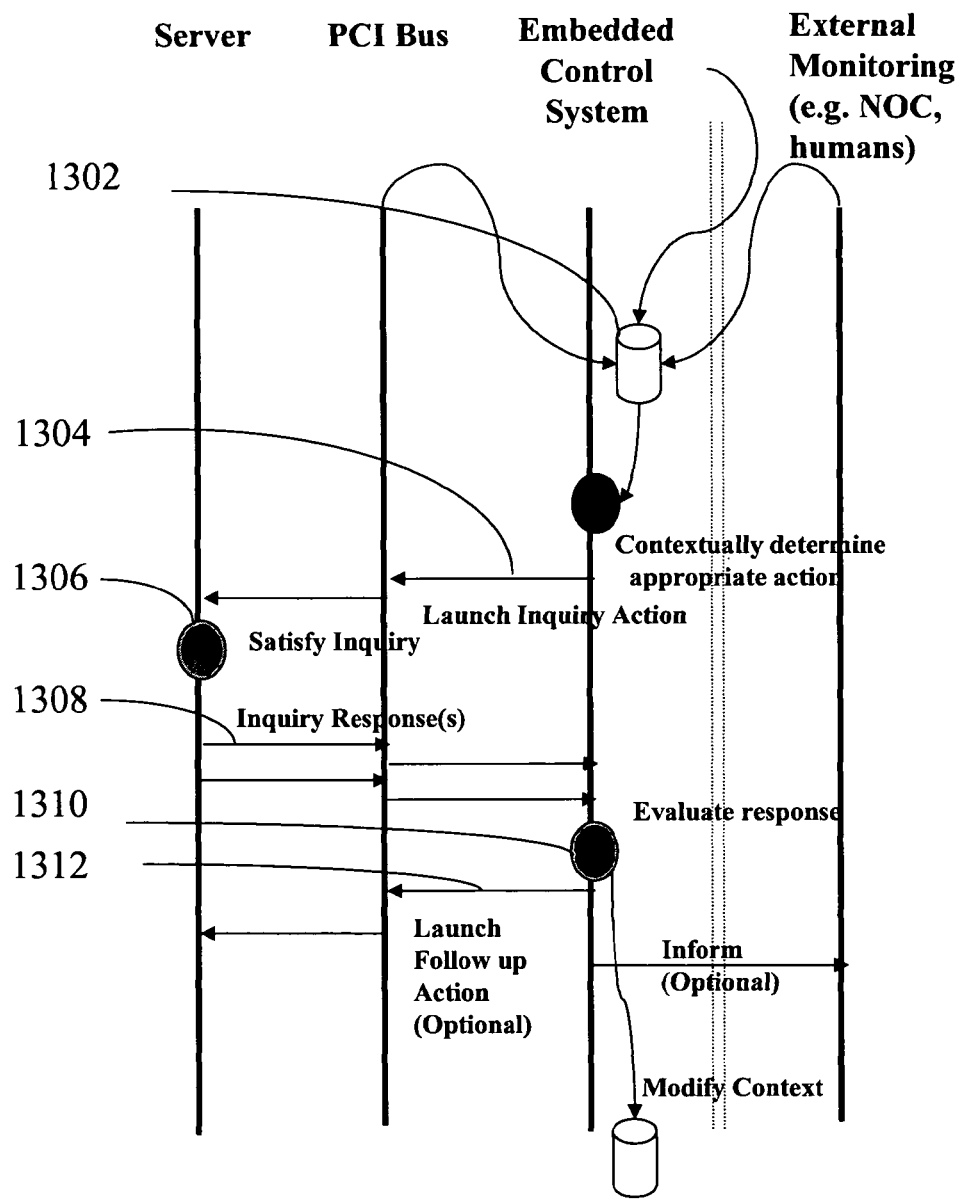
FIG. 13 is a message interaction diagram illustrating server control by the card according to an embodiment of the invention.

FIG. 13 is a message interaction diagram. It describes the character of the autonomic control protocol operating across the PCI bus 116 in the current embodiment of the invention. The control protocol is one that consists of: monitor, analyze, plan, and execute. The autonomic controller 512 of the embedded control system makes an inquiry request at step 1302. The inquiry request occurs during module loading and also as a result of a policy being triggered. The request is transferred across the PCI bus 116 at step 1304 and one or more inquiry responses are provided at step 1306; e.g. the CPU utilization being delivered on a user-defined frequency. The one or more responses are transferred across the PCI bus to the autonomic controller 512 at step 1308. Each response is evaluated by one or more policies at step 1310. Policies may aggregate state; e.g. only do something if the CPU utilization has exceeded 75% for more than 10 minutes. The aggregation of state defines stored context. Context may also be affected by external monitoring, such as is provided by SYSADMINs changing parameter settings from a remote location like a Network Operations Centre (NOC). Depending upon context, follow up actions are initiated at step 1312; e.g. determine the process that is taking the most CPU time.

EXAMPLES

FIGS. 14-25 present message interaction diagram of situations for which the ISAC 202 is designed detect, diagnose and correct.

Figure 14:
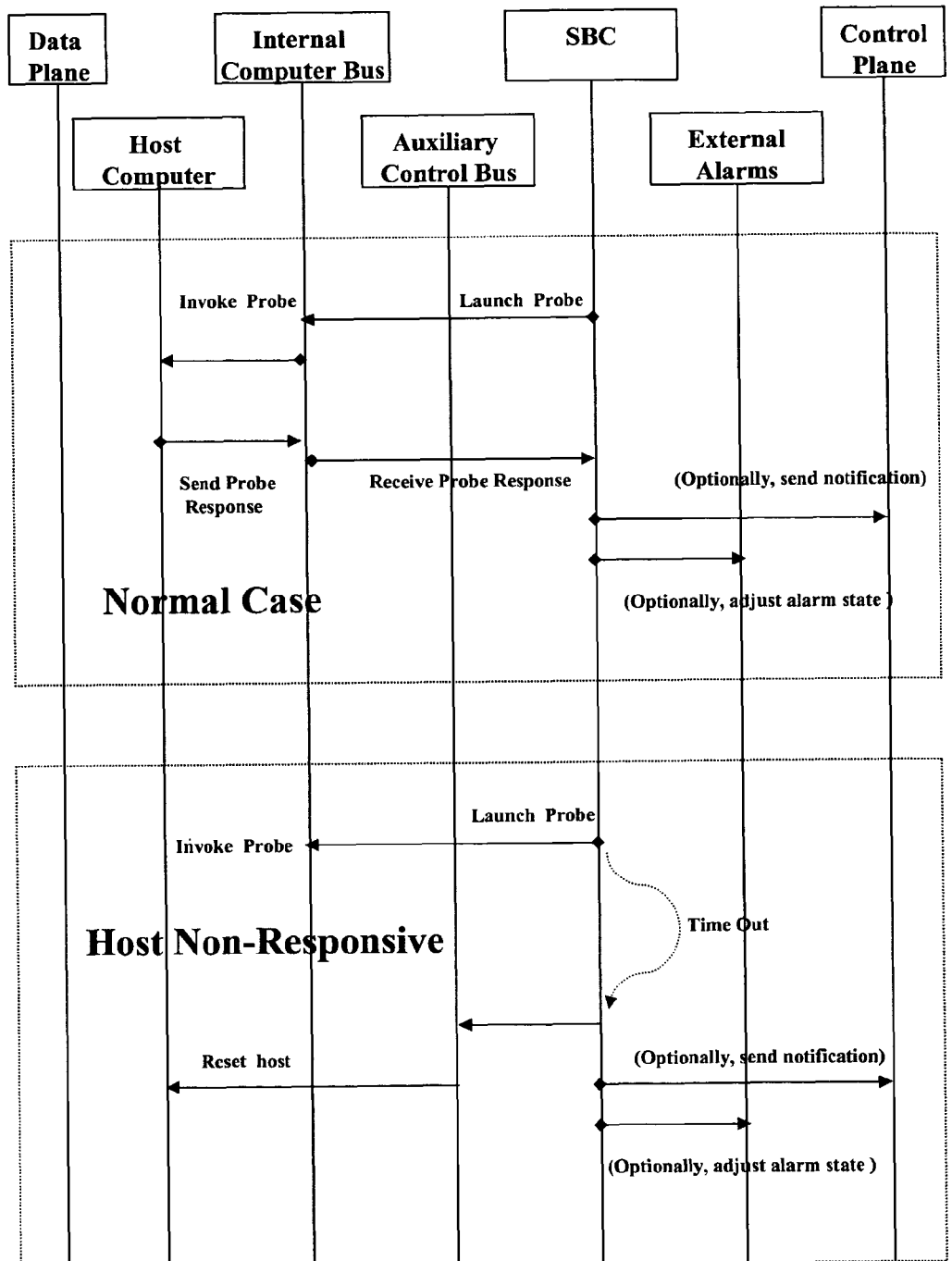
FIG. 14 is a message interaction diagram according to an embodiment of the invention.

FIG. 14 describes a scenario in which a host is determined to be non-responsive. Under normal operation i.e. in the normal case the host provides a response to a probe from the ISAC 202. In the host non-responsive scenario, an internally generated event on the ISAC 202 allows a follow up action to be initiated to reset the server.

Figure 15:
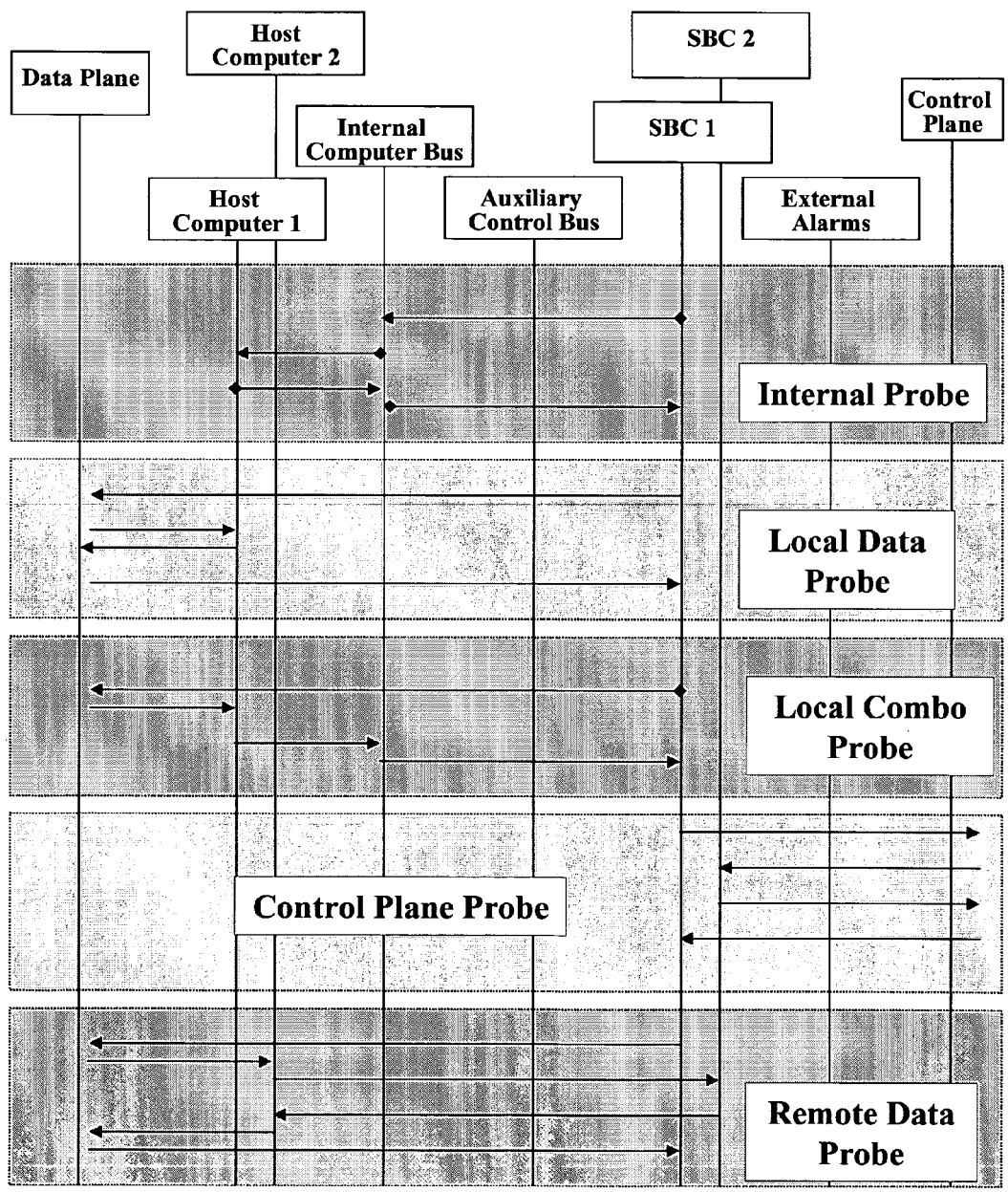
FIG. 15 is a message interaction diagram according to an embodiment of the invention.

FIG. 15 describes the scenario where combinations of internal probes, probe other peripheral cards, probes across the control plane or data plane may be used to diagnose network problems. For example, an inability to ping the server using its network interface (the data plane) via the card network interface may well indicate a network problem if the card can talk to the management console, which is on the control plane.

Figure 16:
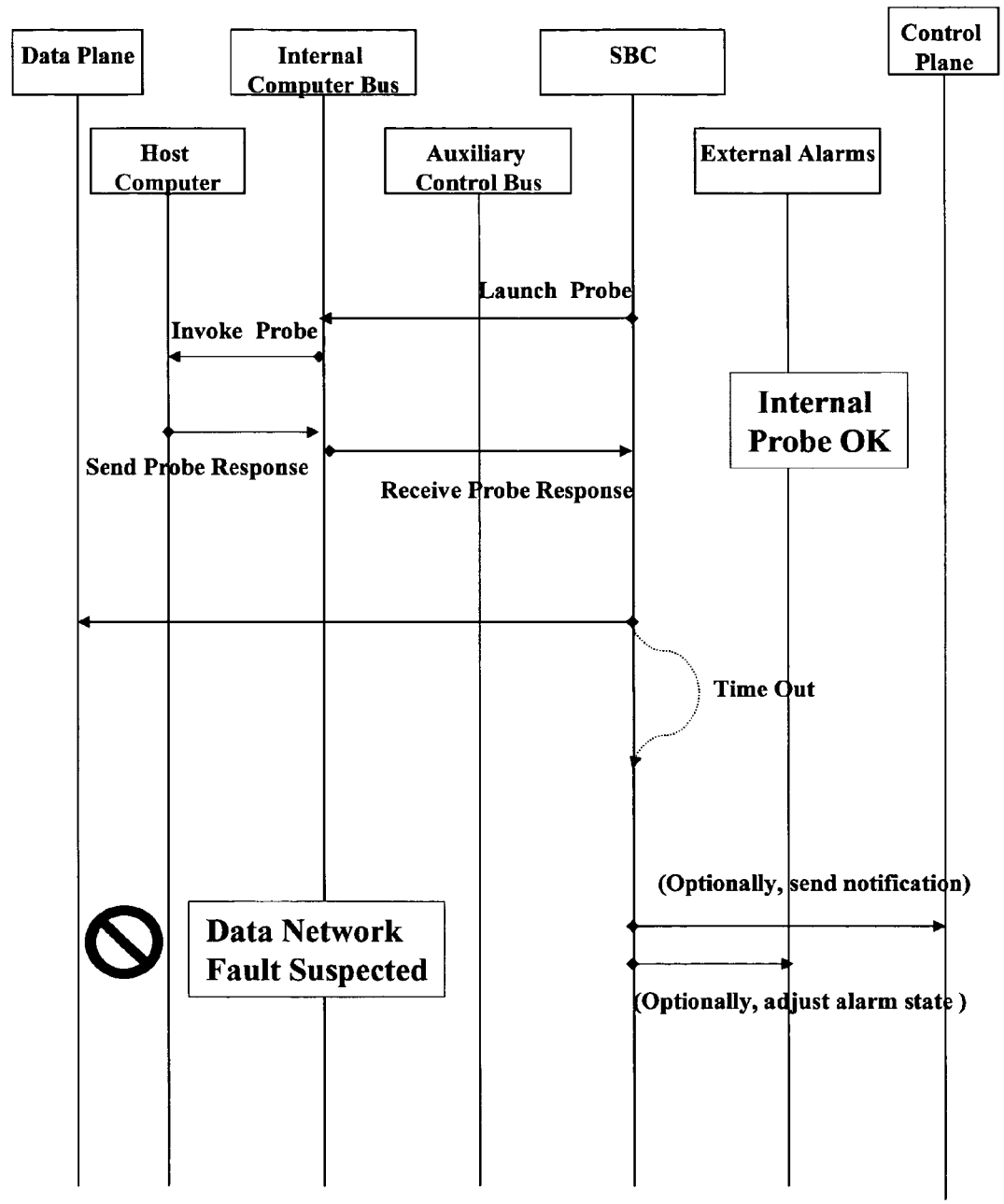
FIG. 16 is a message interaction diagram according to an embodiment of the invention.

FIG. 16 describes the scenario where a data plane probe times out while a bus probe succeeds. A data network fault may be present.

Figure 17:
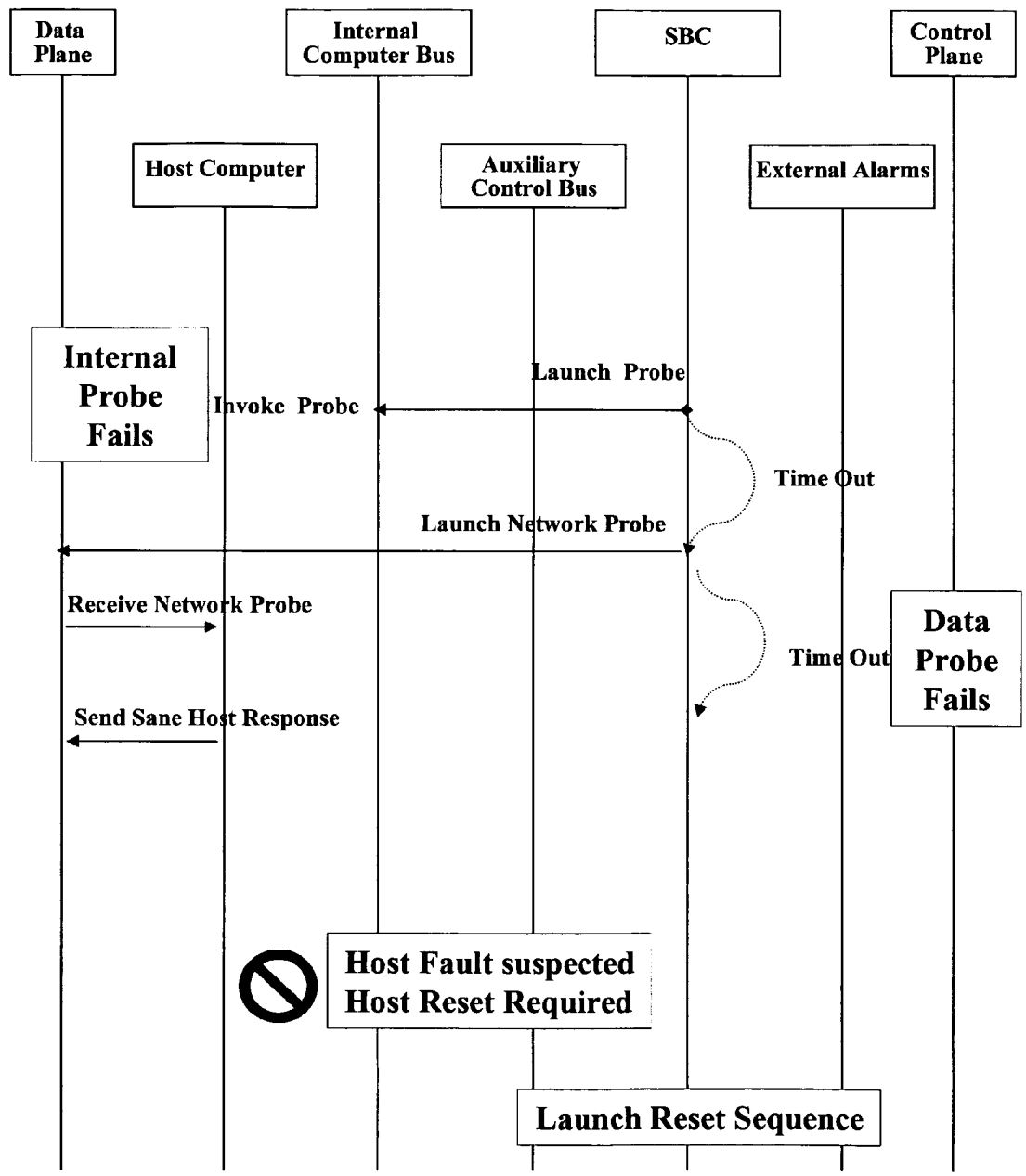
FIG. 17 is a message interaction diagram according to an embodiment of the invention.

FIG. 17 describes the scenario where both internal and data plane probes fail, suggesting a host fault and the host should be reset.

Figure 18:
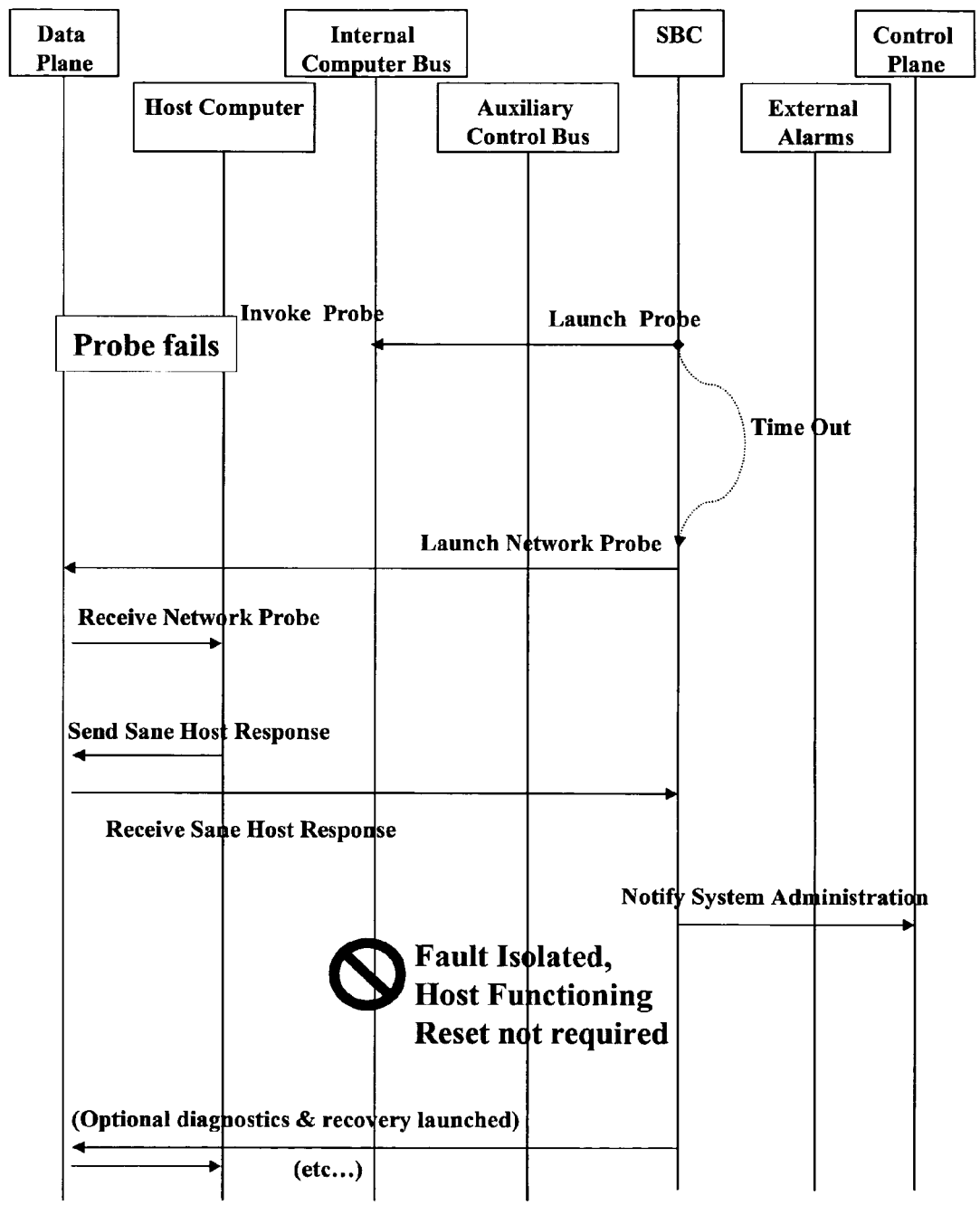
FIG. 18 is a message interaction diagram according to an embodiment of the invention.

FIG. 18 describes a scenario where an internal probe fails and a probe across the data plane succeeds, indicating that the host is alive. Thus an internal fault has occurred and an administrator should be notified. An attempt to remotely stop the host service or restart the PCI driver may also be attempted.

Figure 19:
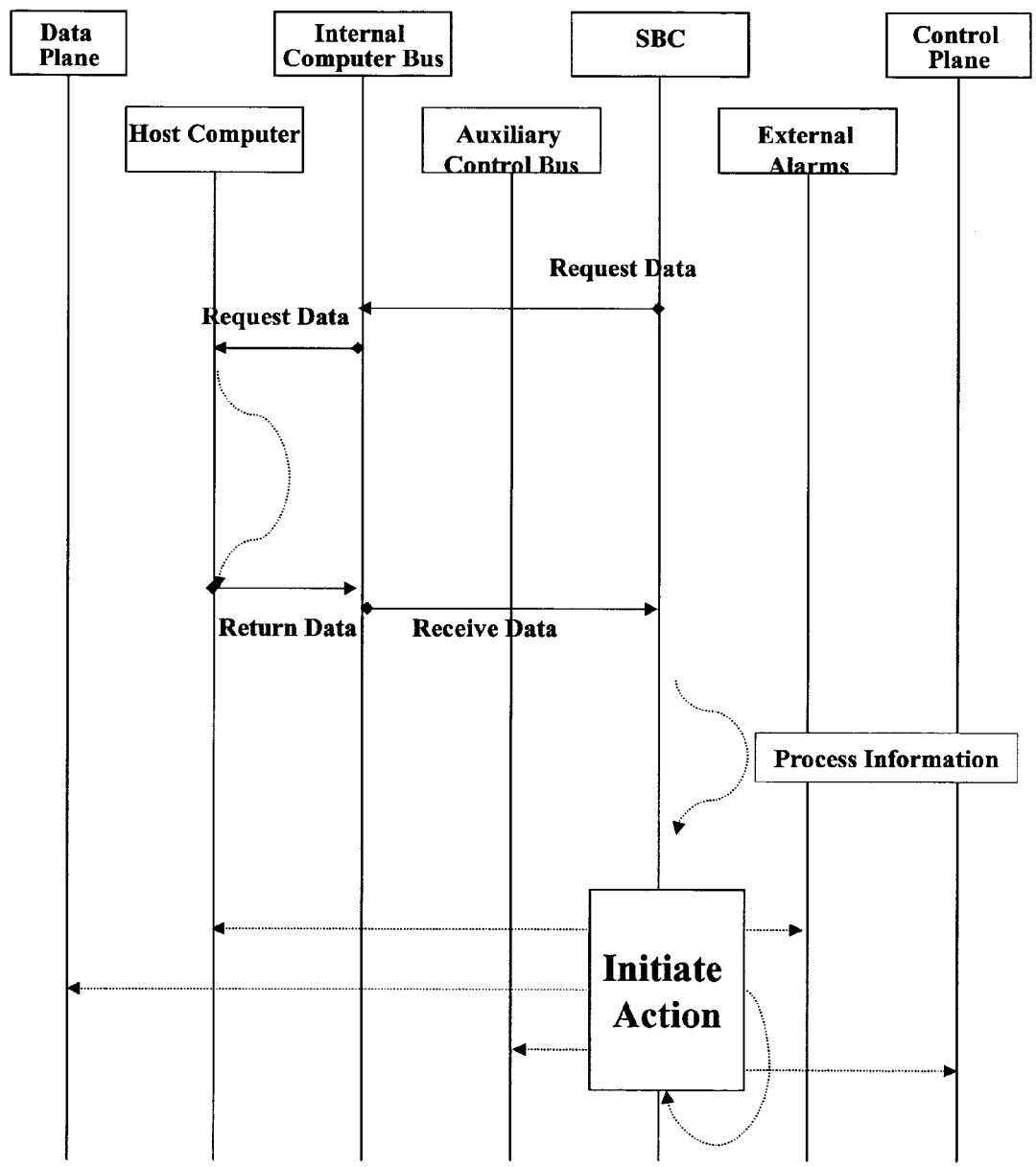
FIG. 19 is a message interaction diagram according to an embodiment of the invention.

FIG. 19 presents a general scenario in which one or more data requests are made across the internal bus. Based upon the processing of the returned data, one or more actions are initiated. The arrow connecting "Initiate Action" to itself allows events to be internally generated as a result of policy rule action. The arrow connecting initiate action to the control plane indicates that event information can be passed to the management console for further processing and action.

Figure 20:
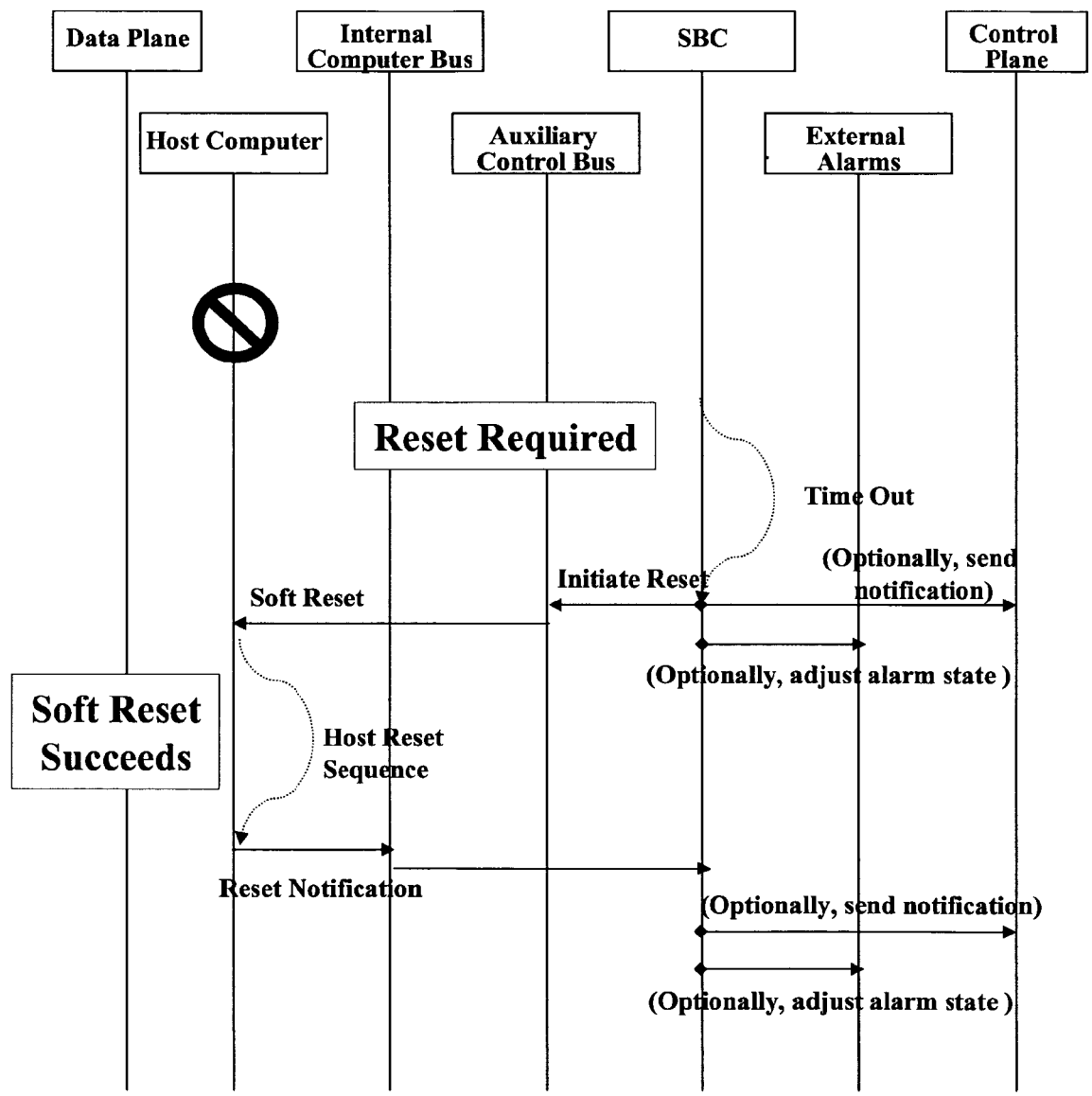
FIG. 20 is a message interaction diagram according to an embodiment of the invention.

FIG. 20 presents the scenario where no heartbeat is detected from the server. The ISAC initiates a reset on the auxiliary bus, subsequently sending a SET alarm to the management console. When the reset succeeds, communication restarts over the internal bus, allowing the CLEAR alarm to be sent to the management console indicating that the problem has been resolved.

Figure 21:
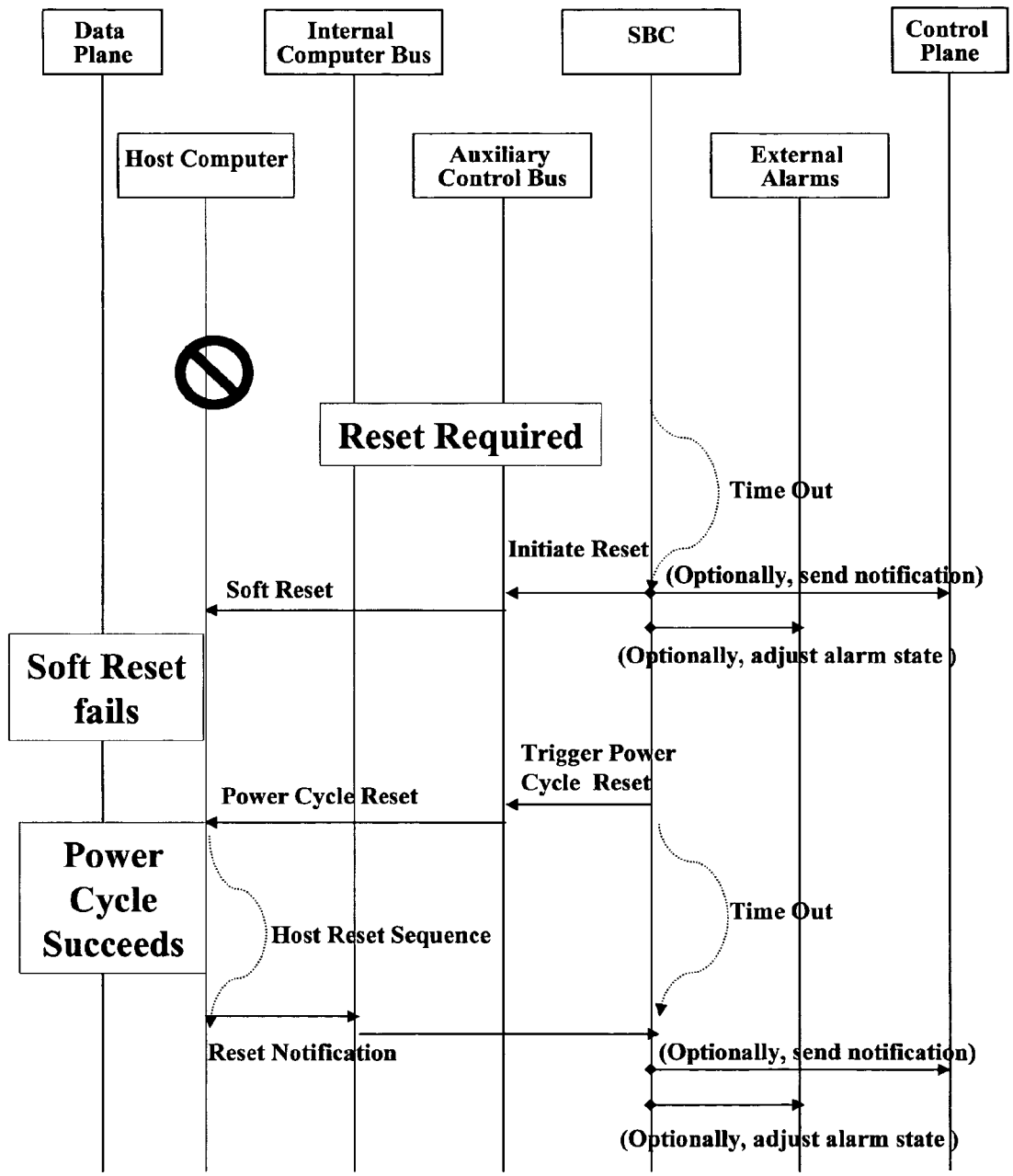
FIG. 21 is a message interaction diagram according to an embodiment of the invention.

FIG. 21 presents the case where the soft reset fails; i.e. a timeout occurs after the soft reset has been attempted. Upon timeout the power cycle reset is initiated across the auxiliary bus and the level of the alarm upgraded to critical. When the power cycle reset succeeds internal communications on the bus are restored, allowing the CLEAR alarm to be sent to the management console indicating that the problem has been resolved.

Figure 22:
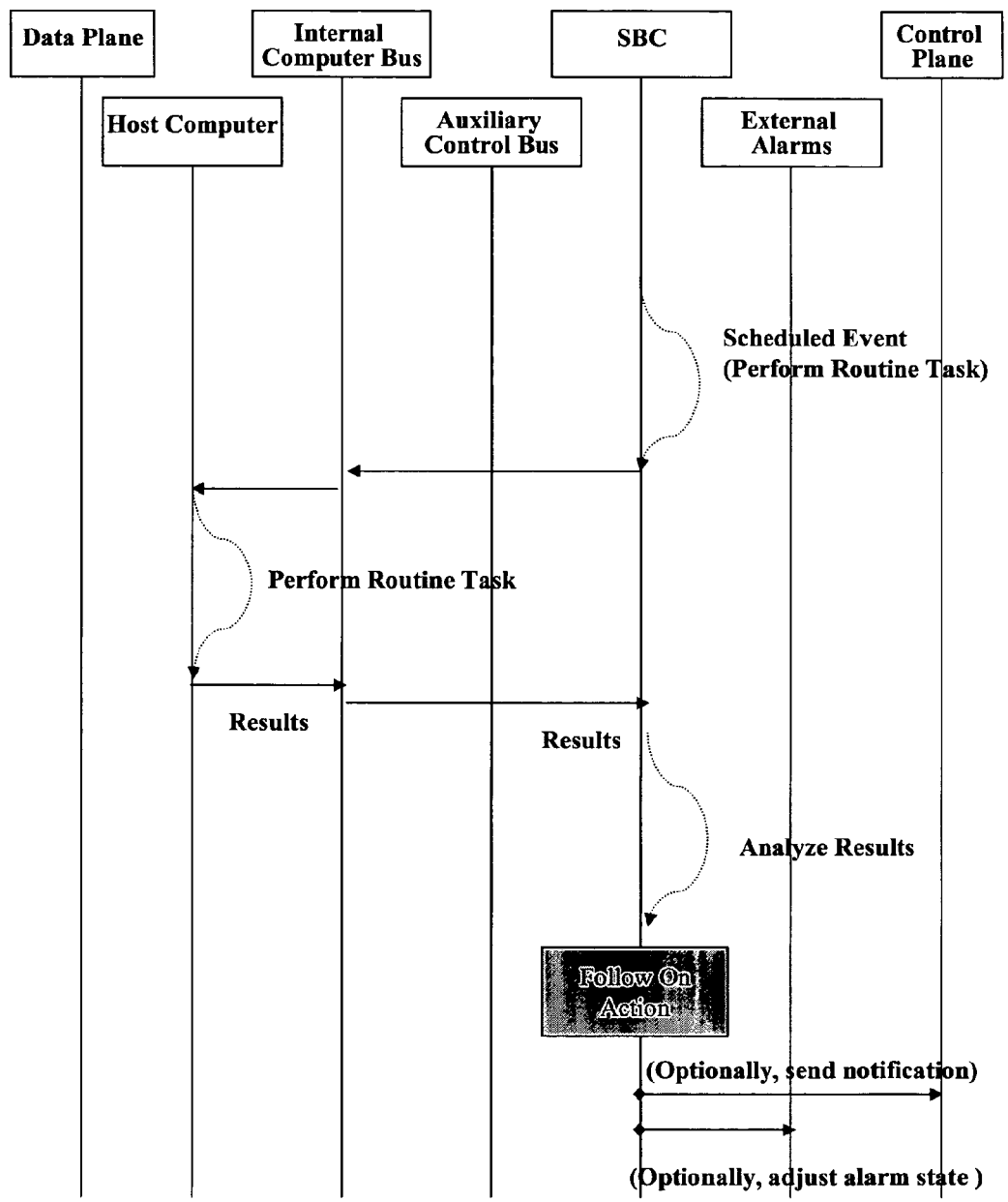
FIG. 22 is a message interaction diagram according to an embodiment of the invention.

FIG. 22 demonstrates how the ISAC can be used to automate routine tasks. A routine task, such as defragmentation of the hard drive is initiated by asking the host service to run a defragmentation task. The request passes across the internal bus. Upon completion, results are returned that indicate the success or failure of the task. Analysis of the results indicates whether follow up actions are required; failure generally causing a SET alarm to be sent to the management console.

Figure 23:
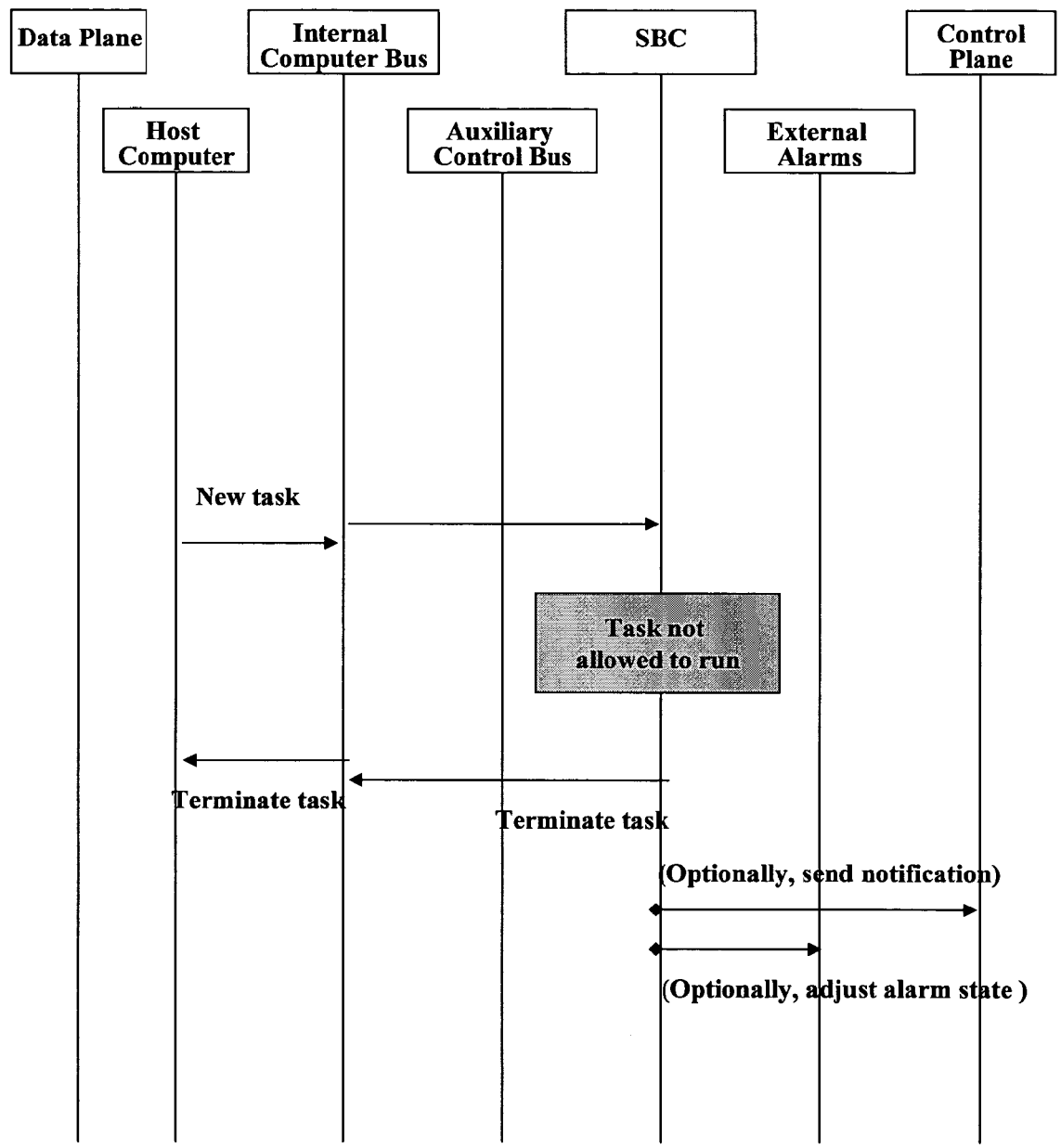
FIG. 23 is a message interaction diagram according to an embodiment of the invention.
Figure 24:
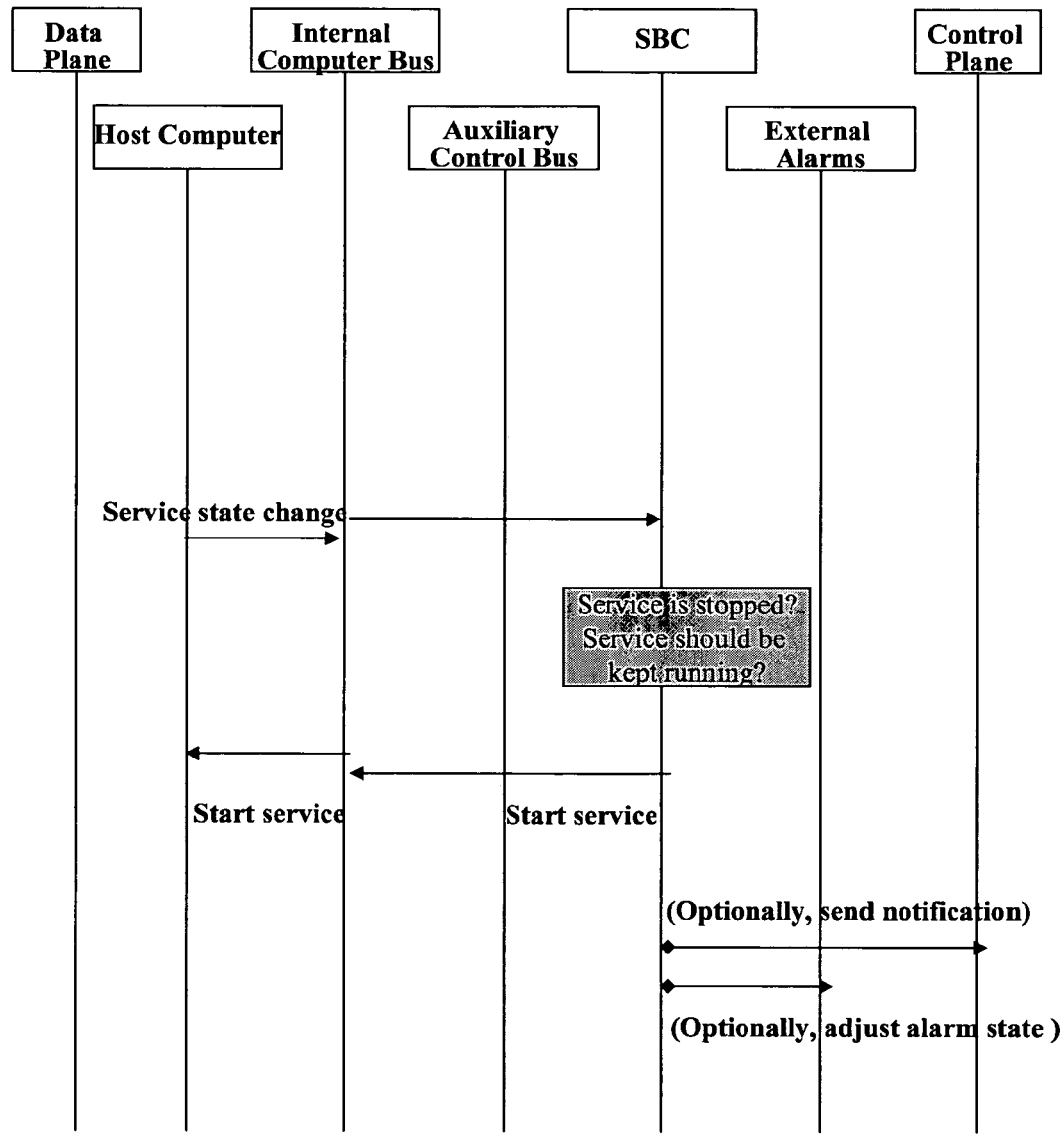
FIG. 24 is a message interaction diagram according to an embodiment of the invention.
Figure 25:
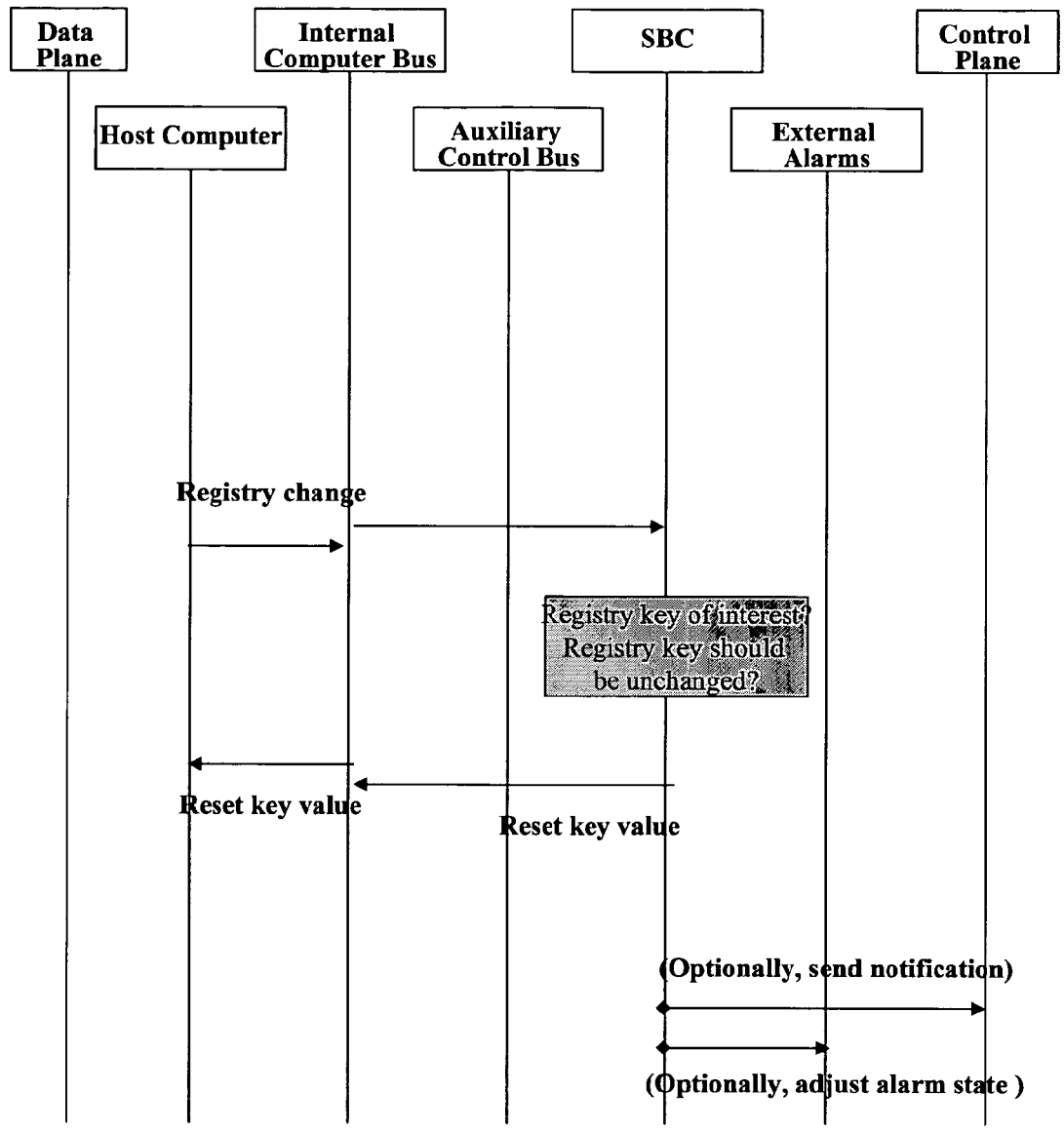
FIG. 25 is a message interaction diagram according to an embodiment of the invention.

FIGS. 23-25 illustrate how the ISAC can be used to implement high value security services. The ISAC is designed to autonomously follow the standard CERT (http://www.cert.org/) security institute guidelines, for recovering from an event (i.e. attack). System administrators unfortunately often skip these guidelines, due to the time-intensive requirements. Since it is often impossible to distinguish between an intelligently orchestrated attack and a software fault, the ISAC forces the recommended CERT strategy on any server that cannot recover using traditional recovery strategies (e.g. warm reboot). This guarantees recovery is successful, and any "backdoor(s)" left by an intruder is removed. FIGS. 23-25 detail information flows and actions that occur in certain security-related-scenarios.

FIG. 23 presents the scenario when process creation events are monitored. A policy is defined that terminates processes that are not explicitly allowed. If a process is created that is not allowed a command is sent via the internal bus to terminate it. An alarm is optionally generated in order to inform the user that an attempt to start an illegal process has occurred. The process creation event and the subsequent termination command are written to an audit log.

FIG. 24 presents the scenario when service state change events are monitored. A policy is defined that keeps services alive. If a service stops that should always be running, a command is sent via the internal bus to restart it. An alarm is optionally generated in order to inform the user that a service stopped but was restarted.

FIG. 25 presents the scenario when registry state change events are monitored. A policy is defined that maintains the values of user-defined registry keys. If a registry key value changes that should remain unchanged, a command is sent via the internal bus to restore it. An alarm is optionally generated in order to inform the user that a registry change was detected but was restored. The registry change event and the subsequent restoration of its previous value are written to an audit log.

The present invention has been described with regard to one or more embodiments. However, it will be apparent to persons skilled in the art that a number of variations and modifications can be made without departing from the scope of the invention as defined in the claims.

What is claimed is:

1. An administration system, embedded within a server system comprising a server computer having a processor, for providing an embedded autonomic control over the server computer, the administration system comprising:
   a separate processor and an autonomic controller, operating independently of the server computer;
   the autonomic controller comprising computer readable instructions stored in a memory, causing the separate processor to perform an autonomic computing based administration of hardware, operating system and software application programs running on the server computer, comprising:
   monitoring the server computer and making observations;
   analyzing the observations;
   determining a policy violation in the server computer;
   managing the server computer; and
   executing specific actions in relation to the policy violation.

2. The administration system of claim 1, wherein the autonomic controller is adapted to receive software upgrades from an external device, or from a computer network, including communication with an external device.

3. The administration system of claim 1, wherein the computer readable instructions further cause the separate processor to receive input from and provide output to a management console.

4. The administration system of claim 1, wherein the computer readable instructions further cause the separate processor to:
   execute an action to correct the operation of the server computer in response to the policy violation; and
   take over host management functions from the server computer in response to the policy violation.

5. The administration system of claim 4, wherein the policy violation comprises security violation, and the action comprises restoring security of the server system.

6. The administration system of claim 4, wherein the action comprises rebooting the server system.

7. The administration system of claim 1, wherein the computer readable instructions further cause the separate processor to perform self configuration, comprising customizing functional modules required for the autonomic control of the server computer.

8. The administration system of claim 7, wherein the customizing comprises modifying a policy on the server computer in real-time.

9. The administration system of claim 8, wherein the policy includes a set of one or more rules that can be modified in real-time.

10. The administration system of claim 7, wherein the customizing comprises modifying policies on the server computer through a web server.

11. The administration system of claim 1, wherein the administration system comprises a power supply independent from the server computer.

12. The administration system of claim 1, wherein the administration system is located on a card inserted within a server system.

13. A method for embedded autonomic administration of a server computer having a processor, in a server system containing the server computer, the method comprising:
  a) providing an administration system, comprising a separate processor and an autonomic controller, the administration system operating independently of the server computer;
  b) at the administration system, by the autonomic controller, performing an autonomic computing based administration of hardware, operating system and software application programs running on the server computer, comprising:
    monitoring the server computer and making observations;
    analyzing the observations;
    determining a policy violation in the server computer;
    managing the server computer; and
    executing specific actions in relation to the policy violation.

14. The method of claim 13, further comprising receiving software upgrades for the autonomic controller from an external device, or from a computer network, including communicating with an external device.

15. The method of claim 13, wherein the step (b) further comprises:
  taking over host management functions from the server computer in response to the policy violation; and
  executing an action to correct the operation of the server computer in response to the policy violation.

16. The method of claim 15, wherein the determining the policy violation comprises determining a security violation, and the executing the action comprises restoring security of the server system.

17. The method of claim 16, wherein the determining the policy violation comprises determining one or more rules, capable of being modified in real-time.

18. The method of claim 13, further comprising self configuring the administration system, including customizing functional modules required for the autonomic computing based administration of the server computer.

19. The method of claim 18, wherein the self-configuring comprises modifying a policy on the server system in real-time.

20. The method of claim 19, wherein the modifying comprises modifying the policy through a web server.

21. The method of claim 13, further comprising providing a power supply to the administration system, which is independent from the server computer.

22. The method of claim 13, comprising placing the administration system on a card inserted within the server system.

23. A server system, comprising:
  a server computer having a processor;
  an administration system embedded within the server system, providing embedded autonomic control over the server computer, the administration system comprising:
  a separate processor, and an autonomic controller, operating independently of the server computer;
  the autonomic controller comprising computer readable instructions stored in a memory, causing the separate processor to perform an autonomic computing based administration of hardware, operating system and software application programs running on the server computer, comprising:
    monitoring the server computer and making observations;
    analyzing the observations;
    determining a policy violation in the server computer;
    managing the server computer; and
    executing specific actions in relation to the policy violation;
  and
  a communications bus providing communications between the server computer and the administration system.

24. The server system of claim 23, wherein the autonomic controller is adapted to receive software upgrades from an external device, or from a computer network, including communication with an external device.

25. The server system of claim 23, wherein the computer readable instructions further cause the separate processor to:
  execute an action to correct the operation of the server system in response to the policy violation; and
  take over host management functions from the server computer in response to the policy violation.

26. The server system of claim 25, wherein the policy violation comprises security violation, and the action comprises restoring security of the server computer.

27. The server system of claim 23, wherein the computer readable instructions further cause the separate processor to perform a self configuration, comprising customizing functional modules required for the autonomic control of the server computer.

28. The server system of claim 27, wherein the customizing comprises modifying a policy on the server computer in real-time.

29. The server system of claim 23, wherein the administration system is located on a card inserted within the server system, comprising the server computer, and independently powered from the server computer.

30. The server system according to claim 23, wherein the administration system has a power supply independent from the server computer.

* * * * *